(12) United States Patent
Liu et al.

(10) Patent No.: US 11,415,557 B2
(45) Date of Patent: Aug. 16, 2022

(54) TEMPO-SPATIAL EVOLUTION TEST SYSTEM FOR ROCK BREAKING IN DEEP AND COMPLEX ENVIRONMENT

(71) Applicants: Sichuan University, Chengdu (CN); Chengdu University, Chengdu (CN)

(72) Inventors: Jianfeng Liu, Chengdu (CN); Yan Wan, Chengdu (CN); Jun Zheng, Chengdu (CN); Lu Wang, Chengdu (CN); Dongjie Xue, Chengdu (CN); Chunping Wang, Chengdu (CN); Qiangxing Zhang, Chengdu (CN)

(73) Assignees: SICHUAN UNIVERSITY, Chengdu (CN); CHENGDU UNIVERSITY, Chengdu (CN)

( * ) Notice: Subject to any disclaimer, the term of this patent is extended or adjusted under 35 U.S.C. 154(b) by 434 days.

(21) Appl. No.: 16/699,123

(22) Filed: Nov. 29, 2019

(65) Prior Publication Data
US 2020/0217821 A1 Jul. 9, 2020

(30) Foreign Application Priority Data

Nov. 29, 2018 (CN) .......................... 201811447460.3

(51) Int. Cl.
*G01N 29/14* (2006.01)
*G01N 29/22* (2006.01)

(52) U.S. Cl.
CPC .......... *G01N 29/14* (2013.01); *G01N 29/223* (2013.01); *G01N 29/228* (2013.01); *G01N 2291/0232* (2013.01)

(58) Field of Classification Search
CPC .... G01N 29/14; G01N 29/223; G01N 29/228; G01N 2291/0232
USPC ......................................................... 73/649
See application file for complete search history.

(56) References Cited

U.S. PATENT DOCUMENTS 11,280,762 B2 * 3/2022 Xu ....................... G01N 29/223

FOREIGN PATENT DOCUMENTS

| CN | 204479520 U | * | 7/2015 | |
|---|---|---|---|---|
| CN | 107219122 A | * | 9/2017 | ............. G01N 1/286 |
| CN | 108445085 A | * | 8/2018 | ............. G01N 29/14 |

* cited by examiner

*Primary Examiner* — Lisa M Caputo
*Assistant Examiner* — Rose M Miller
(74) *Attorney, Agent, or Firm* — Bayramoglu Law Offices LLC

(57) ABSTRACT

A tempo-spatial evolution test system for rock breaking in deep and complex environment includes an acoustic emission sensor assembly and an acoustic emission amplifier assembly that are arranged on a rock mechanics test system. A triaxial cavity coupling bracket is arranged on an outer wall of the triaxial cavity and between two sets of acoustic emission sensor assemblies. The triaxial cavity coupling bracket includes a plate-shaped bracket, two sickle-shaped brackets, and at least three bracket bolts, which can be tightly wrapped on the outer wall of the triaxial cavity. A lateral side of the plate-shaped bracket vertically fixes two guide columns. The acoustic emission amplifier assembly is arranged between the two guide columns and is located above the plate-shaped bracket, and the acoustic emission amplifier assembly is connected to the acoustic emission sensor assembly through a signal line.

16 Claims, 11 Drawing Sheets

TEMPO-SPATIAL EVOLUTION TEST SYSTEM FOR ROCK BREAKING IN DEEP AND COMPLEX ENVIRONMENT

CROSS REFERENCE TO THE RELATED APPLICATIONS

This application is based upon and claims priority to Chinese Patent Application No. 201811447460.3, filed on Nov. 29, 2018, the entire contents of which are incorporated herein by reference.

TECHNICAL FIELD

The present invention relates to the field of real-time monitoring of rock damage and breaking process under high temperature and high pressure, and more particularly, to a tempo-spatial evolution test system for rock breaking in deep and complex environment.

BACKGROUND

In order to research the mechanical properties of rocks in deep environments, high temperature and high confining pressure triaxial tests are needed. Moreover, in the test processes, to determine associated energy parameters involved, acoustic emission coupling needs to be frequently performed on the rock damage process.

At present, there are no fixing devices having good stable contact and easy translocation for existing acoustic emission test sensors used in coupled acoustic emission detection tests. As a result, existing acoustic emission test sensors have the following defects.

A. Existing acoustic emission sensors do not have reasonably designed fixing sleeve. Arc-shaped outer walls of triaxial cavities, for example, cannot maintain a full, linear and stable contact with the sensors, which interferes with stable and continuous electric signal reception. This may easily lead to failure of tempo-spatial evolution test systems for rock breaking in deep and complex environments.

B. Devices for fixing acoustic emission sensors, such as adhesive bonding, tape wrapping, or rubber bands, function in an unreasonable manner. In one aspect, the sensors may move as test cavities are lifted and lowered in the test process, which may induce the change of acoustic emission signal locating points, thereby causing initial locating conditions of each test piece to be different. In another aspect, in the test process, the acoustic emission sensors may be separated from or even fall off the triaxial test cavities, thereby resulting in separation of the tempo-spatial evolution test systems for rock breaking in deep and complex environment from signal sources and interruption of acoustic emission data transmission, which may have a negative effect on the continuity and accuracy of the test results. In addition, the adhesive manner is not easy for translocation, and the sensors and circuits thereof may be easily damaged in disassembly and repair processes. Therefore, excess hours of manpower and substantial financial resources are wasted as sensors are needed to be overhauled.

Furthermore, acoustic emission amplifiers connected to the acoustic emission sensors in the existing test systems are generally placed on rear platforms of the existing test systems or tied to upright columns on two sides of the test systems, which has the following defects.

C. Bending or kinking of the signal lines may occur and negatively impact the transmission effect of the electric signals resulting in poor detection.

D. The acoustic emission amplifiers contact the triaxial cavities of the test systems. Under high-temperature test conditions, the signals transmitted by the acoustic emission amplifiers are disordered, such that reasonable and effective scientific test data cannot be obtained.

E. In test batch samples, the change of the to-be-tested samples may cause transmission line connection interfaces to be disturbed. This means that the line stability in the test process is not in a steady state and thus causes a significant systemic error to the test, thereby having a negative effect on the authenticity of the test results.

Therefore, in order to ensure the accuracy, continuity, and stability of the test data, it is necessary to equip a rock test machine for researching mechanical properties of rocks with a dedicated tempo-spatial evolution test system for rock breaking in deep and complex environment. This test system has to be able to guarantee the accuracy and stability of signal in an acoustic emission test process under high temperature and high pressure conditions.

SUMMARY

An objective of the present invention is to provide a tempo-spatial evolution test system for rock breaking in deep and complex environment, so as to solve the problems of acoustic emission signal interference and signal inaccuracy occurring under the conditions of triaxial high temperature and high pressure, seepage and coupling in the rock breaking test process under high temperature and high pressure.

The present invention is implemented by the following technical solution. The tempo-spatial evolution test system for rock breaking in deep and complex environment includes an acoustic emission sensor assembly and an acoustic emission amplifier assembly that are arranged on a rock mechanics test system. The rock mechanics test system includes a triaxial cavity base, a triaxial cavity arranged on the triaxial cavity base, and a triaxial cavity lifting oil cylinder fixedly arranged on a top frame of the rock mechanics test system. The output end of the triaxial cavity lifting oil cylinder is mounted with a lifting rod and the lower lifting end of the lifting rod is fixed to the top of the triaxial cavity. An upright column, a test piece indenter and an indenter base are coaxially arranged from top to bottom in the inner cavity of the triaxial cavity. The upright column is fixed to the top frame of the rock mechanics test system by a bolt, and the indenter base is fixed to the triaxial cavity base. Between the test piece indenter and the indenter base there is space for placing a test piece, and the triaxial cavity lifting oil cylinder drives the triaxial cavity through the lifting rod to move up and down along the upright column.

An outer wall of the triaxial cavity is provided with a set of acoustic emission sensor assembly in positional correspondence with the test piece indenter and a set of acoustic emission sensor assembly in positional correspondence with the indenter base, and a triaxial cavity coupling bracket is arranged between the two sets of acoustic emission sensor assembly. The triaxial cavity coupling bracket includes a plate-shaped bracket, two sickle-shaped brackets, and at least three bracket bolts. The two symmetrically arranged sickle-shaped brackets are directly connected to each other at one end through the bracket bolt, and another end thereof extends far away from the triaxial cavity and are connected, in an approaching manner, to the same plate-shaped bracket through the bracket bolts. The main body of the triaxial cavity coupling bracket mainly composed of one plate-shaped bracket and two sickle-shaped brackets is annular and is tightly hooped on the outer wall of the triaxial cavity. Two sets of guide columns are installed on the frame of the rock mechanics test system, and the acoustic emission amplifier assembly is mounted between the two sets of guide columns and is located above the plate-shaped bracket. The acoustic emission amplifier assembly is connected, through a signal line, to the acoustic emission sensor assembly mounted on the triaxial cavity.

When the rock mechanics test system is in operation, the triaxial cavity moves downward to fit with the triaxial cavity base, and at this moment, the acoustic emission amplifier assembly does not contact the plate-shaped bracket. When the rock mechanics test system stops working and lifts the triaxial cavity, the triaxial cavity coupling bracket is lifted together with the triaxial cavity and the plate-shaped bracket holds up the acoustic emission amplifier assembly such that the acoustic emission amplifier assembly is lifted.

To better implement the present invention, further, the acoustic emission amplifier assembly includes an acoustic emission amplifier and an acoustic emission amplifier placing rack where the acoustic emission amplifier is mounted. The acoustic emission amplifier placing rack includes a structural plate internally divided into a plurality of compartments and having a frame structure, and a polyvinyl chloride (PVC) heat insulation layer attached to each compartment. The compartment is opened at the top and bottom, and the acoustic emission amplifier is exactly embedded into the compartment and two ends of the acoustic emission amplifier are connected to the signal line protruding from the compartment.

To better implement the present invention, further, two ends of the structural plate are respectively mounted with a pulley, and the two guide columns are respectively provided with a guide rail or a sliding chute allowing the pulley to slide up and down linearly. The tail end at the bottom of the guide rail or the sliding chute is higher than the upper top surface of the plate-shaped bracket, such that even though the structural plate moves to the lowest position, the acoustic emission amplifier still does not contact the plate-shaped bracket.

To better implement the present invention, further, the width of the pulley matches the width of the sliding chute, and the pulley is stuck in the sliding chute after a small elastic deformation occurs in a transverse direction. At this moment, the pulley embedded into the sliding chute can bear the weight of the acoustic emission amplifier placing rack and the weight of the acoustic emission amplifier without sliding freely.

Alternatively, the pulleys are coaxially connected in pairs, and the two coaxially connected pulleys are spaced apart from each other to form space that can be stuck on two sides of the guide rail. After the two pulleys on two sides of the guide rail undergo a small elastic deformation in the transverse direction, the two pulleys are stuck on the two sides of the guide rail to clamp the guide rail. At this moment, the two pulleys clamping the guide rail can bear the weight of the acoustic emission amplifier placing rack and the weight of the acoustic emission amplifier without sliding freely.

To better implement the present invention, further, the acoustic emission amplifier placing rack includes a structural plate provided with a plurality of grooves, and the PVC heat insulation layer attached to each of the grooves. The size of the groove couples to that of the acoustic emission amplifier, the plurality of grooves arranged in a row in parallel are provided with a buckle fixed to the structural plate at two ends arranged perpendicular to an arrangement direction, and the buckle is configured to fixedly connect the signal line of the acoustic emission amplifier.

The groove may be either unidirectionally open or bidirectionally open. A unidirectionally open groove generally is opened upward, and a bidirectionally open groove generally is opened upward and downward. The acoustic emission amplifier may be exactly embedded into the groove without falling. That is, the size of the groove couples to that of the acoustic emission amplifier. The arrangement direction of a plurality of grooves where the acoustic emission amplifiers are arranged is defined as a transverse direction, and a buckle is arranged at each of the two ends perpendicular to the transverse direction in the groove, wherein the buckle is welded or bonded or stuck on the structural plate.

To better implement the present invention, further, the inner cavity of the triaxial cavity is provided with a semi-suspended thermal conductive copper wire and an internal temperature sensor for testing an internal temperature of the triaxial cavity. The outer wall of the triaxial cavity is fitted with a heating element and an external temperature sensor for testing an outer wall temperature of the triaxial cavity. A signal line access panel connected to the external temperature sensor and the internal temperature sensor is arranged along the bottom of the indenter base annularly and is in a communication connection, through the signal line, to an acquisition and control module of a display module arranged outside the triaxial cavity.

To better implement the present invention, further, the triaxial cavity lifting oil cylinder is in a communication connection to the acquisition and control module, and the acquisition and control module outputs a control signal to the triaxial cavity lifting oil cylinder for system control. Meanwhile, a manual lifting device is further arranged on an oil pipeline where the triaxial cavity lifting oil cylinder is connected to an oil tank, and the manual lifting device outputs a control signal to the triaxial cavity lifting oil cylinder for manual control.

To better implement the present invention, further, the acoustic emission sensor assembly includes a plurality of acoustic emission detection heads and a clamp fixing spring. Each acoustic emission detection head includes an acoustic emission sensor and an acoustic emission sensor clamp arranged in one to one correspondence.

The acoustic emission sensor clamp includes a coupling screw, as well as a clamp cover, a clamp cylinder and a coupling panel which are in threaded connection in sequence. The clamp cover includes a cover body provided with an internal thread, and a cover spring installed at the center of the bottom surface of the inner cavity of the cover body. Two ends of the cylinder wall of the clamp cylinder are provided with an external thread, and an end of the cylinder wall is provided with an arc-shaped notch allowing the signal line to pass through, and three cut-through coupling holes are evenly distributed on the cylinder wall along a circumferential direction, and three coupling screws pass through the three coupling holes respectively to clamp the acoustic emission sensor in a radial direction of the clamp cylinder at the center of the inner cavity of the clamp cylinder. The upper surface of the coupling panel is flat and straight and is provided with a threaded through hole at the center of the upper surface, and the lower surface of the coupling panel is bent along a uniaxial direction and forms a cambered surface fitting with the outer surface of the cylinder wall of the clamp cylinder.

The triaxial cavity is further provided with two sets of acoustic emission detection heads in positional correspondence with two ends of the test piece, wherein each set of acoustic emission detection heads is composed of N acoustic emission detection heads uniformly distributed on the outer wall of the triaxial cavity along a circumferential direction and the clamp fixing spring connecting the N acoustic emission detection heads end to end to form a ring. Two ends of the acoustic emission sensor are respectively connected to the clamp fixing spring extending into the acoustic emission detection heads from the arc-shaped notch, and the clamp fixing spring in a stretched state provides the acoustic emission sensor with a pressure forcing the acoustic emission detection head to stably fit with the outer wall of the triaxial cavity, wherein N is a positive integer greater than 2.

To better implement the present invention, further, the clamp cylinder includes an outer metal cylinder, an inner metal cylinder, and a cooling water circulation pipeline. Between the outer metal cylinder and the inner metal cylinder coaxially sleeved there is formed a condensation cavity communicating with the cooling water circulation pipeline and allowing condensate to be introduced.

To better implement the present invention, further, the outer metal cylinder is made of copper, and the inner metal cylinder is also made of copper.

Compare with the prior art, the present invention has the following advantages and beneficial effects:

(1) According to the present invention, the acoustic emission amplifier assembly can be mounted by extending the quick-disconnect triaxial cavity coupling bracket far away from the triaxial cavity. High temperature of the triaxial cavity is not in direct conduction to the acoustic emission amplifier in a high-temperature test, such that interference of high temperature with the acoustic emission amplifier is avoided, thereby solving the problem of acoustic emission signal interference and signal inaccuracy due to triaxial high temperature and high pressure, seepage and coupling in the rock breaking test process under high temperature and high pressure.

(2) The triaxial cavity coupling bracket of the present invention is mainly composed of two sickle-shaped brackets, a plate-shaped bracket, and a bracket bolt. In one aspect, the overall stability of the triaxial cavity coupling bracket can be maintained, and the triaxial cavity coupling bracket can follow the lifting/falling of the triaxial cavity during the test. In another aspect, the triaxial cavity coupling bracket may be released quickly, and after its position is adjusted as required, the triaxial cavity coupling bracket may be hooped again on a new position of the outer wall of the triaxial cavity.

(3) The present invention avoids disturbance of signal transmission data lines of the acoustic emission amplifier caused by lifting the triaxial cavity in the test process, solves bending or kinking of the signal lines, overcomes the transmission effect of electric signals, and guarantees detection effects of different rock test processes. In addition, after the first test is completed, no check is needed in subsequent tests, which greatly improves the test efficiency.

(4) In the high-temperature test process, there is cooling circulating water around the acoustic emission sensor, which effectively avoids the endangerment due to damage or accuracy deterioration of the acoustic emission sensor caused by high temperature, making it available for tests under high temperature and ensuring the consistency of operation states of test equipment under different high temperatures, such that the trouble of an adverse effect of high temperature on test signals when the acoustic emission sensor is tested at high temperature may be overcome, the service life of the sensor may be prolonged, and economic costs may be greatly saved.

(5) The acoustic emission sensor clamp is internally provided with a coupling screw, such that sensors with different frequencies and sizes can be simultaneously used in acoustic emission location tests, which overcomes the trouble that it is difficult to test using sensors with different frequencies concurrently, and provides more complete and reliable data for explaining mechanisms of rock damage.

(6) Two ends of the clamp cylinder may be directly connected to the coupling panel. It is more beneficial to improving the cooling effect if the end of the clamp cylinder where the arc-shaped notch is provided is connected to the clamp cover provided with a spring. Furthermore, after the clamp cover is removed, it is more convenient to replace the sensor since the open end is free. This saves time when the replacing the sensor during the test, which may not only substantially improve test efficiency, but will also not negatively affect the coupling and transmission of other sensors in the replacement process.

(7) In the lifting process of the triaxial cavity, two ends of a cable connecting the acoustic emission sensor and the acoustic emission amplifier and two ends of a cable connecting the acoustic emission amplifier and the acquisition and control module are never disturbed. In this way, the effect of accurate acoustic emission signal and strong anti-interference performance is achieved for the rock mechanics test system under high temperature and high pressure.

Figure 1:
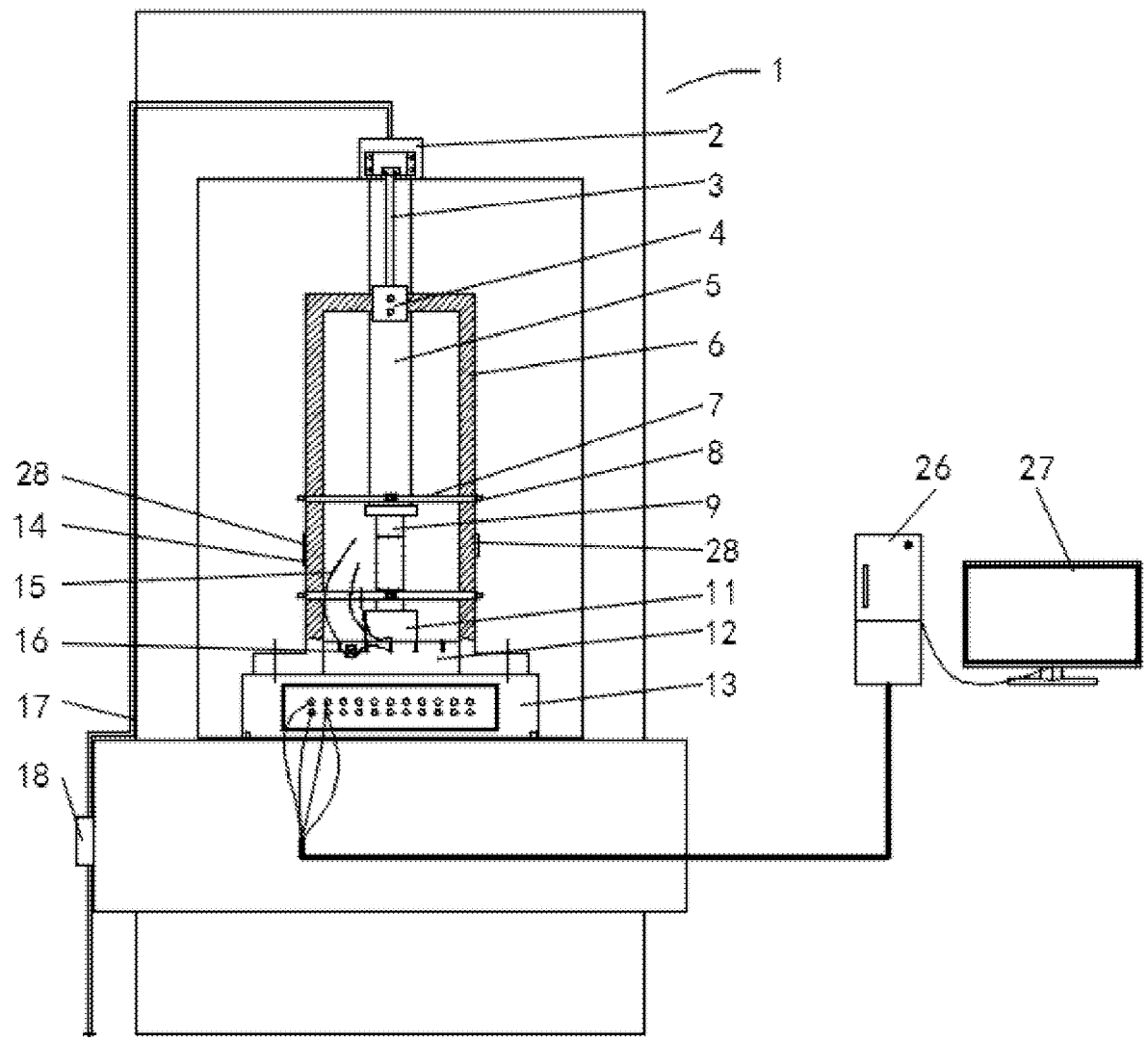
FIG. 1 is a schematic structural diagram of the tempo-spatial evolution test system for rock breaking in deep and complex environment according to the present invention.

In the drawings: rock mechanics test system 1; triaxial cavity lifting oil cylinder 2; lifting rod 3; lower lifting end 4; upright column 5; triaxial cavity 6; clamp fixing spring 7; acoustic emission sensor clamp 8; clamp cover 8-1; cover spring 8-1-1; cover body 8-1-2; clamp cylinder 8-2; arc-shaped notch 8-2-1; coupling hole 8-2-2; outer metal cylinder 8-2-3; inner metal cylinder 8-2-4; cooling water circulation pipeline 8-2-5; coupling screws 8-3; coupling panel 8-4; test piece indenter 9; triaxial cavity coupling bracket 10; plate-shaped bracket 10-1; sickle-shaped bracket 10-2; bracket bolts 10-3-1, 10-3-2 and 10-3-3; indenter base 11; signal line access panel 12; triaxial cavity base 13; external temperature sensor 14; thermal conductive copper wire 15; internal temperature sensor 16; oil pipeline 17; manual lifting device 18; guide columns 20; guide rail 20-1; sliding chute 20-2; acoustic emission amplifier 23; triaxial cavity support extending rack 25; acquisition and control module 26; display module 27; heating element 28; acoustic emission amplifier placing rack 30; structural plate 30-1; PVC heat insulation layer 30-2; pulley 30-3; and buckle 30-4.

DETAILED DESCRIPTION OF THE EMBODIMENTS

Embodiment 1

As shown in FIG. 1 to FIG. 18B, an embodiment of the tempo-spatial evolution test system for rock breaking in deep and complex environment is shown. The test system 1 includes an acoustic emission sensor assembly and an acoustic emission amplifier assembly that are arranged on the rock mechanics test system 1. The rock mechanics test system 1 includes the triaxial cavity base 13, the triaxial cavity 6 arranged on the triaxial cavity base 13, and the triaxial cavity lifting oil cylinder 2 fixedly mounted on a top frame of the rock mechanics test system 1. The output end of the triaxial cavity lifting oil cylinder 2 is mounted with the lifting rod 3 and the lower lifting end 4 of the lifting rod 3 is fixed to the top of the triaxial cavity 6. The upright column 5, the test piece indenter 9 and the indenter base 11 are coaxially installed from top to bottom in the inner cavity of the triaxial cavity 6. The upright column 5 is fixed to the top frame of the rock mechanics test system 1 by a bolt, and the indenter base 11 is fixed to the triaxial cavity base 13. Between the test piece indenter 9 and the indenter base 11 there is space for placing a test piece, and the triaxial cavity lifting oil cylinder 2 drives the triaxial cavity 6 through the lifting rod 3 to move up and down along the upright column 5.

The rock mechanics test system 1 performs a system control through the acquisition and control module 26, and displays an operation interface and a test result through the display module 27 connected to the acquisition and control module 26. Between the test piece indenter 9 and the indenter base 11 there is space for placing a test piece. An alignment pin of an indenter oil cylinder mounted at the bottom of the rock mechanics test system 1 is inserted into an alignment hole at the bottom of the triaxial cavity base 13. The acquisition and control module 26 sends a command to the indenter oil cylinder to control the alignment pin of the indenter oil cylinder to rise and push the test piece indenter 9 into contact with the upright column 5. In the process of applying a force to a rock test piece, the upright column 5 receives and transmits the force to the top frame of the rock mechanics test system 1.

Figure 2:
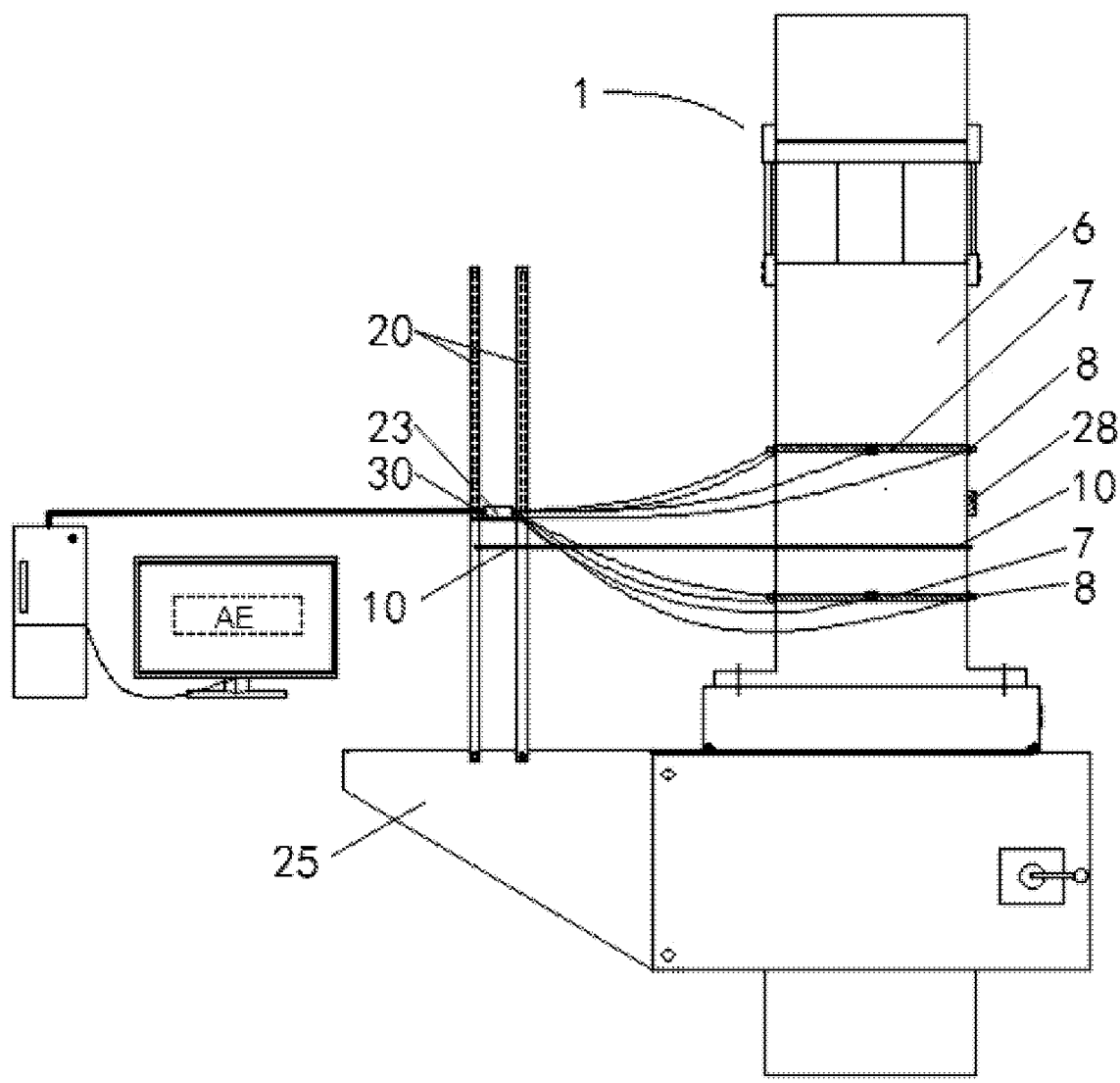
FIG. 2 is a schematic diagram showing a connection relationship between the triaxial cavity coupling bracket, the triaxial cavity and the acoustic emission amplifier placing rack according to the present invention.
Figure 3:
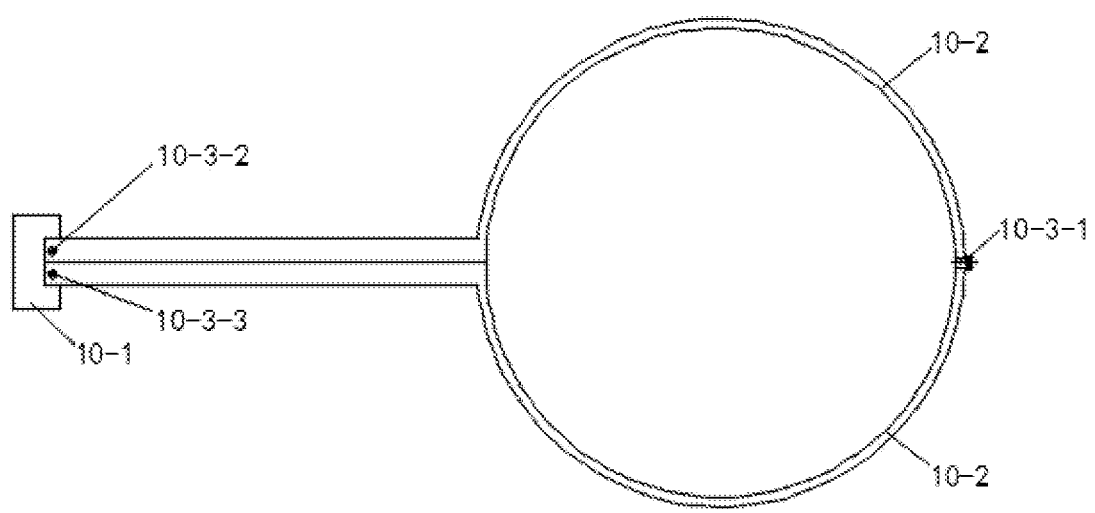
FIG. 3 is a schematic structural diagram of the triaxial cavity coupling bracket.
Figure 4:
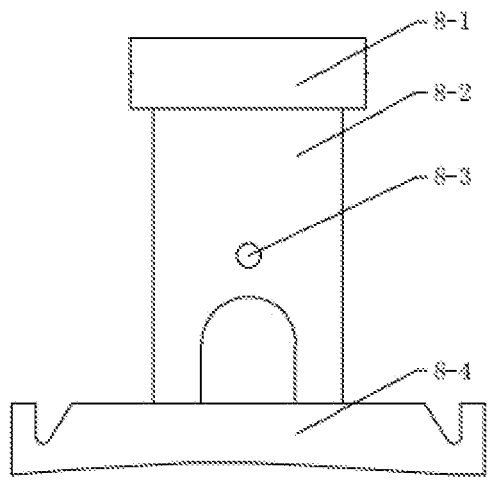
FIG. 4 is a schematic diagram of the overall structure of the acoustic emission sensor clamp.
Figure 5:
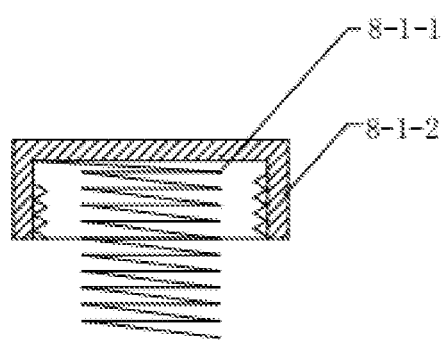
FIG. 5 is a schematic diagram of a sectional structure of the clamp cover.
Figure 6:
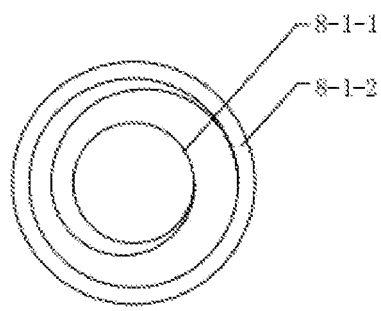
FIG. 6 is a bottom view of the clamp cover.
Figure 7:
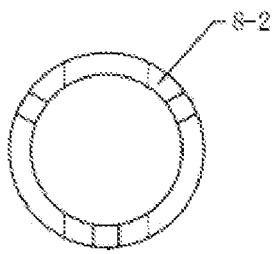
FIG. 7 is a schematic structural diagram of the clamp cylinder.
Figure 8:
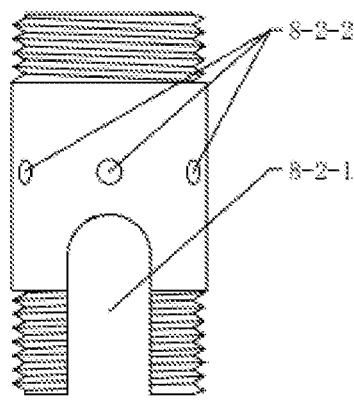
FIG. 8 is a cross-sectional view showing the structure through a common plane of an axis of a coupling hole.
Figure 9:
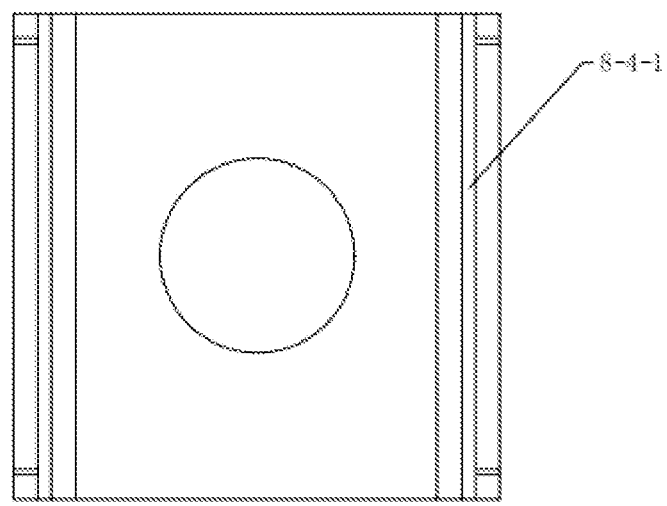
FIG. 9 is a top view showing the structure of the coupling panel.
Figure 10:
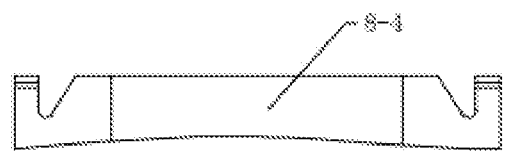
FIG. 10 is a front view showing the structure of the coupling panel.
Figure 11:
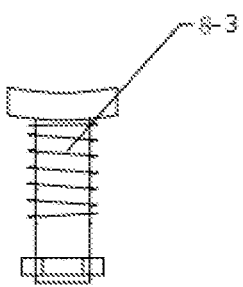
FIG. 11 is a schematic structural diagram of the coupling screw.
Figure 12:
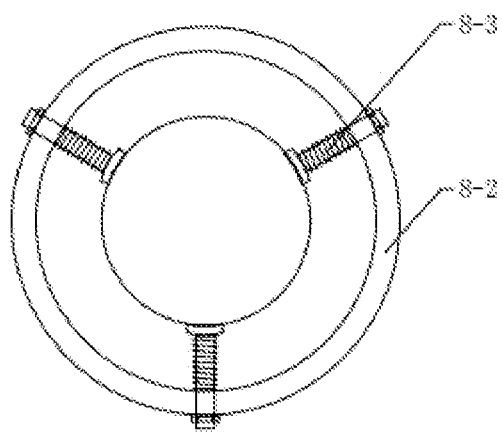
FIG. 12 is a schematic diagram showing that the coupling screws are mounted on the clamp cylinder to clamp a test piece.
Figure 13:
FIG. 13 is a schematic structural diagram of the clamp fixing spring.

As shown in FIG. 2 and FIG. 3, the outer wall of the triaxial cavity 6 is provided with a set of acoustic emission sensor assemblies in positional correspondence with the test piece indenter 9 and a set of acoustic emission sensor assemblies in positional correspondence with the indenter base 11, and the triaxial cavity coupling bracket 10 is arranged between the two sets of acoustic emission sensor assemblies. The triaxial cavity coupling bracket 10 includes the plate-shaped bracket 10-1, two sickle-shaped brackets 10-2, and at least three bracket bolts 10-3-1, 10-3-2 and 10-3-3. The two symmetrically arranged sickle-shaped brackets 10-2 are directly connected at one end through the bracket bolt 10-3-1, another end thereof extends far away from the triaxial cavity 6 and is connected, in an approaching manner, to the same plate-shaped bracket 10-1 through the bracket bolts 10-3-2 and 10-3-3. The main body of the triaxial cavity coupling bracket 10 mainly composed of one plate-shaped bracket 10-1 and two sickle-shaped brackets 10-2 is annular and is tightly wrapped on the outer wall of the triaxial cavity 6. Two sets of guide columns 20 are arranged on the frame of the rock mechanics test system 1, and the acoustic emission amplifier assembly is mounted between the two guide columns 20 and is located above the plate-shaped bracket 10-1. The acoustic emission amplifier assembly is connected, through a signal line, to the acoustic emission sensor assembly mounted on the triaxial cavity 6. The bottom of the guide column 20 is directly welded to or fixed to the triaxial cavity support extending rack 25 of the rock mechanics test system 1 by bolts.

When the rock mechanics test system 1 is in operation, the triaxial cavity 6 moves downward to fit with the triaxial cavity base 13, and at this moment, the acoustic emission amplifier assembly does not contact the plate-shaped bracket 10-1. When the rock mechanics test system 1 stops working and lifts the triaxial cavity 6, the triaxial cavity coupling bracket 10 is lifted together with the triaxial cavity 6 and the plate-shaped bracket 10-1 holds up the acoustic emission amplifier assembly such that the acoustic emission amplifier assembly is lifted.

The guide column 20 for guided installation of the acoustic emission amplifier placing rack 30 does not directly contact the plate-shaped bracket 10-1, but is separately fixed to the triaxial cavity support extending rack 25.

In the test process, after the test piece is properly placed, the triaxial cavity 6 moves downward to touch the triaxial cavity base 13. At this moment, the acoustic emission amplifier assembly moves downward with the triaxial cavity 6 to the lowest position, and at this moment, a distance is kept between the acoustic emission amplifier 23 and the acoustic emission amplifier placing rack 30 of the acoustic emission amplifier assembly and the plate-shaped bracket 10-1. That is, neither the acoustic emission amplifier 23 nor the acoustic emission amplifier placing rack 30 of the acoustic emission amplifier assembly directly touches the plate-shaped bracket 10-1. In this case, high temperature of the triaxial cavity 6 exerts little negative effect on the acoustic emission amplifier 23.

Upon completion of the test, the acquisition and control module 26 sends a command to the triaxial cavity lifting oil cylinder 2 to lift the triaxial cavity 6 via the lifting rod 3, and the triaxial cavity coupling bracket 10 and the acoustic emission sensor assembly mounted on the triaxial cavity 6 are lifted together with the triaxial cavity 6. After the triaxial cavity 6 is lifted for a distance, the plate-shaped bracket 10-1 touches the acoustic emission amplifier placing rack 30 of the acoustic emission amplifier assembly. The triaxial cavity 6 is further lifted, the plate-shaped bracket 10-1 holds up the acoustic emission amplifier placing rack 30 (the acoustic emission amplifier assembly) where the acoustic emission amplifier 23 is installed such that the acoustic emission amplifier placing rack 30 is lifted together along the guide column 20. Two ends of a cable connecting the acoustic emission sensor and the acoustic emission amplifier 23 and two ends of a cable connecting the acoustic emission amplifier 23 and the acquisition and control module 26 are never disturbed. In this way, the effect of accurate acoustic emission signal and strong anti-interference performance is achieved for the rock mechanics test system under high temperature and high pressure.

Figure 16A:
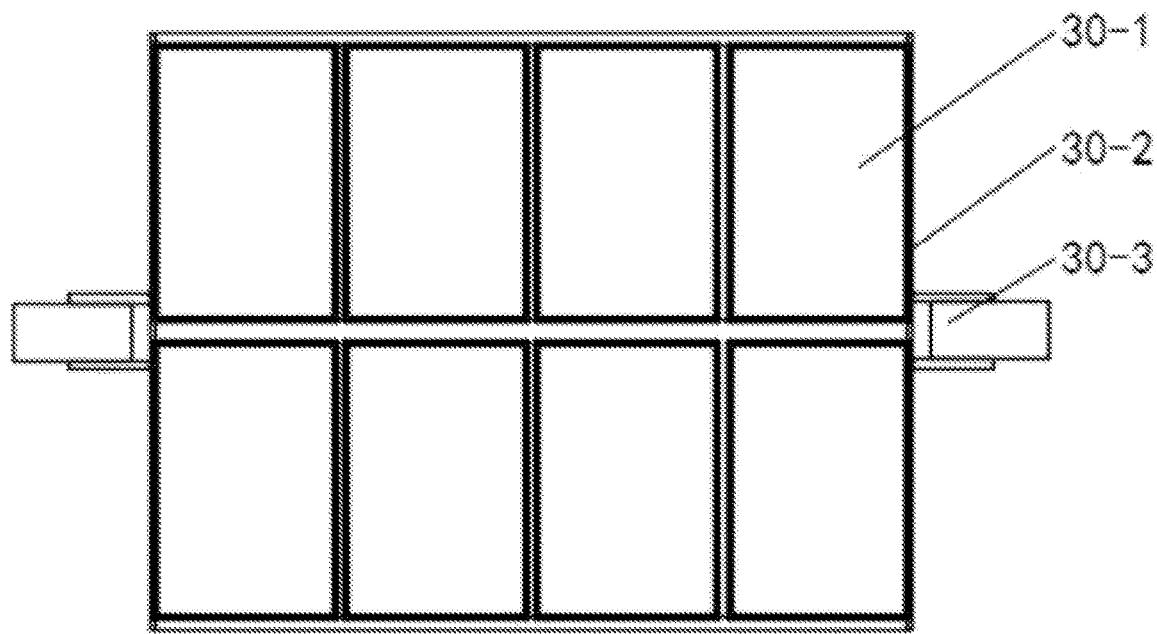
FIG. 16A is a structural schematic diagram of the acoustic emission amplifier placing rack having open grids in two rows and four columns.
Figure 16B:
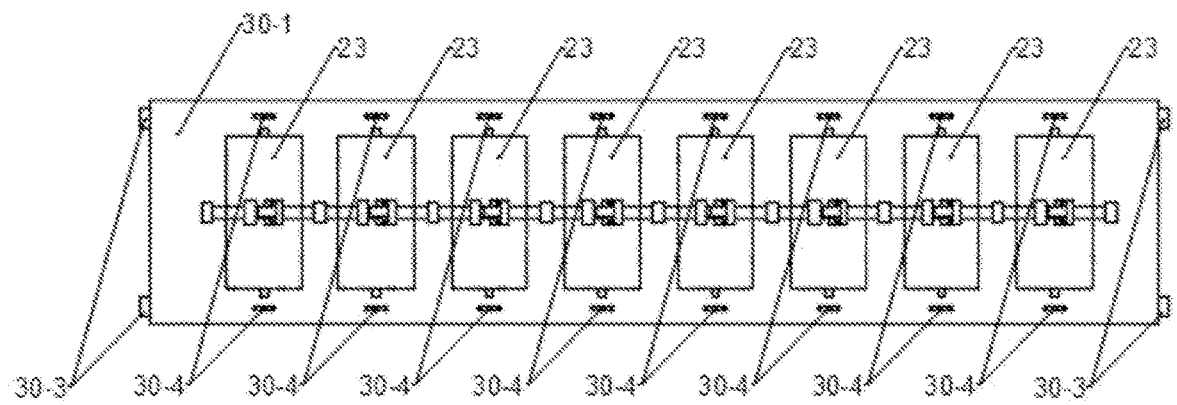
FIG. 16B is a structural schematic diagram of the acoustic emission amplifier placing rack having grooves in one row and eight columns.

As shown in FIG. 16A and FIG. 16B, the acoustic emission amplifier assembly includes the acoustic emission amplifier 23 and the acoustic emission amplifier placing rack 30 where the acoustic emission amplifier 23 is mounted. The acoustic emission amplifier placing rack 30 includes the structural plate 30-1 internally divided into a plurality of compartments and having a frame structure, and the PVC heat insulation layer 30-2 attached to each compartment. The compartment is opened at the top and bottom, and the acoustic emission amplifier 23 is exactly embedded into the compartment and two ends of the acoustic emission amplifier 23 are connected to the signal line protruding from the compartment.

As shown in FIG. 16A and FIG. 16B, the acoustic emission amplifier placing rack 30 includes the structural plate 30-1 provided with a plurality of grooves, and the PVC heat insulation layer 30-2 attached to each of the grooves. The size of the groove couples to that of the acoustic emission amplifier 23, and a plurality of grooves arranged in a row in parallel are provided with the buckle 30-4 fixed to the structural plate 30-1 at two ends arranged perpendicular to an arrangement direction, and the buckle 30-4 is configured to fixedly connect the signal line of the acoustic emission amplifier 23.

As shown in FIG. 16A and FIG. 16B, the acoustic emission amplifier placing rack 30 is mainly the structural plate 30-1 having a structure for placing eight acoustic emission amplifiers 23.

As shown in FIG. 16A, one structural plate 30-1 is provided with eight open grids with the PVC heat insulation layer 30-2 inside. The eight open grids are arranged in two rows and four columns, and eight acoustic emission amplifiers 23 may be placed in the eight open grids.

As shown in FIG. 16B, one structural plate 30-1 is provided with eight grooves with the PVC heat insulation layer 30-2 inside. The eight grooves are arranged in one row and eight columns, and one acoustic emission amplifier 23 is placed in each of the eight grooves. That is, eight acoustic emission amplifiers 23 in total are placed in one acoustic emission amplifier placing rack 30. Two ends of the groove are respectively provided with the buckle 30-4 for fixedly connecting the signal line of the acoustic emission amplifier 23 so as to further ensure that the signal line connected is straight, neither bent nor twisted.

In the high-temperature test process, the PVC heat insulation layer 30-2 can effectively prevent thermal energy conducted from the high-temperature cavity wall to the outer metal cylinder wall from further flowing to the acoustic emission amplifier 23, such that an adverse effect on the acoustic emission signal may be eliminated. Using the acoustic emission amplifier placing rack 30 has the following advantages. First, the acoustic emission amplifier 23 can be separated from the cavity wall of the triaxial cavity 6 to achieve heat insulation, and an adverse effect of the high temperature on the acoustic emission device may be reduced in the high-temperature test process. Second, the acoustic emission signal line of the acoustic emission device can be smoothly transitioned instead of being bent freely, thereby ensuring smooth input and output of the signal without leading to problems such as interference signals and weak signals caused by bending of the signal line. Third, using the acoustic emission amplifier placing rack 30 may overcome defects of easy slipping and poor aesthetic appearance caused by a fact that most of acoustic emission amplifiers 23 in the current laboratories are randomly hung on side walls of cavities or stacked on a certain bracket.

In this embodiment, as shown in FIG. 2, two sickle-shaped brackets 10-2 which are directly connected at one end and connected at the other end by the same plate-shaped bracket 10-1 are hooped on the outer wall of the triaxial cavity 6. In one aspect, the overall stability of the triaxial cavity coupling bracket 10 can be maintained, and the triaxial cavity coupling bracket 10 can follow the lifting/falling of the triaxial cavity 6 during the test. In another aspect, the triaxial cavity coupling bracket 10 may be released quickly, and after its position is adjusted as required, the triaxial cavity coupling bracket 10 may be hooped again on a new position of the outer wall of the triaxial cavity 6.

The acoustic emission amplifier placing rack 30 may be adjusted upward or downward along the guide column 20. The specific structure of the acoustic emission amplifier placing rack 30 for lifting adjustment is mainly as below.

Structure I:

Two ends of the structural plate 30-1 are respectively mounted with the pulley 30-3, and the two guide columns 20 are respectively provided with the guide rail 20-1 allowing the pulley 30-3 to slide up and down linearly. The tail end at the bottom of the guide rail 20-1 is higher than the upper top surface of the plate-shaped bracket 10-1, such that even though the structural plate 30-1 moves to the lowest position, the acoustic emission amplifier 23 still does not touch the plate-shaped bracket 10-1.

Figure 18A:
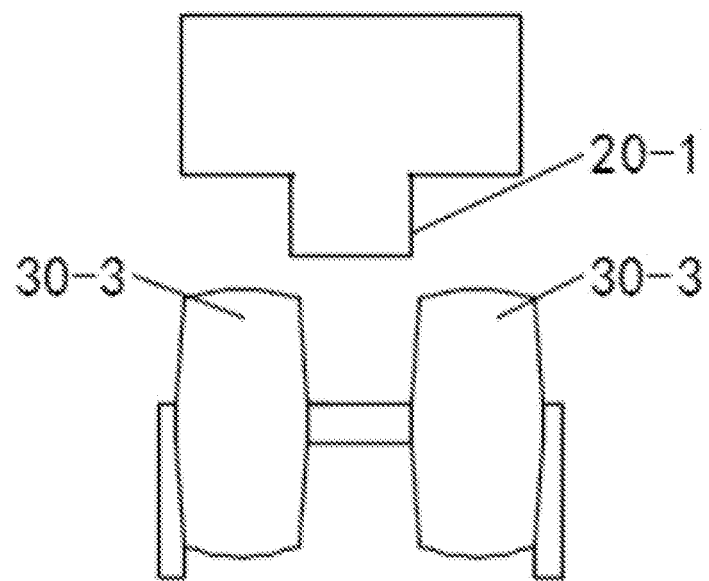
FIG. 18A illustrates a structural schematic diagram showing that a guide rail is arranged on the guide column.
Figure 18B:
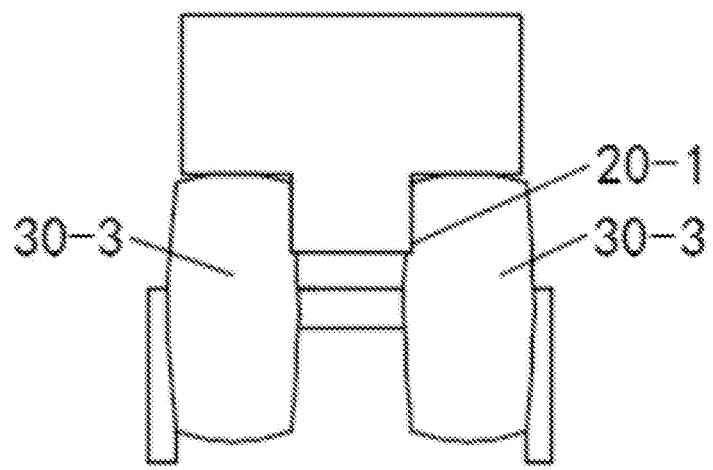
FIG. 18B illustrates a schematic diagram showing a connection relationship between the guide column provided with the guide rail and the pulley.

As shown in FIG. 18A and FIG. 18B, the pulleys 30-3 are coaxially connected in pairs, and the two coaxially connected pulleys 30-3 are spaced apart from each other to form space that can be stuck on two sides of the guide rail 20-1. After the two pulleys 30-3 on the two sides of the guide rail 20-1 undergo a small elastic deformation in the transverse direction, the two pulleys 30-3 are stuck on the two sides of the guide rail 20-1 to clamp the guide rail 20-1. At this moment, the two pulleys 30-3 clamping the guide rail 20-1 can bear the weight of the acoustic emission amplifier placing rack 30 and the weight of the acoustic emission amplifier 23 without sliding freely.

Figure 15:
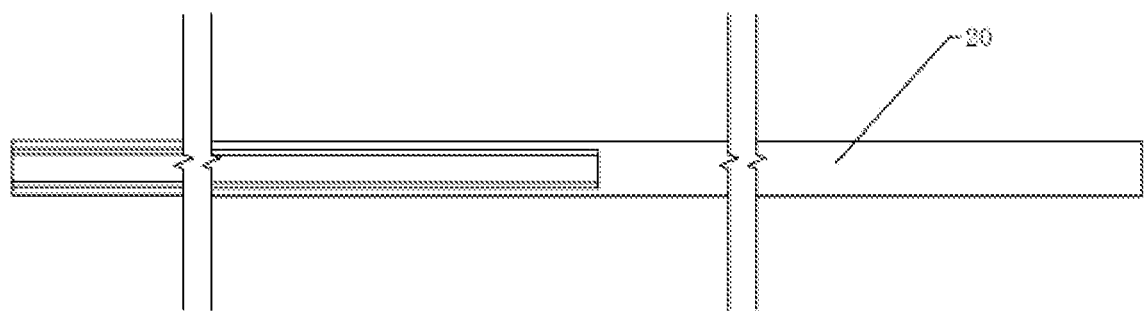
FIG. 15 is a front view showing the structure of the guide column.

Structure II:

As shown in FIG. 15, two ends of the structural plate 30-1 are respectively provided with the pulley 30-3, and the two guide columns 20 are respectively provided with the sliding chute 20-2 allowing the pulley 30-3 to slide up and down linearly. The tail end at the bottom of the sliding chute 20-2 is higher than the upper top surface of the plate-shaped bracket 10-1, such that even though the structural plate 30-1 moves to the lowest position, the acoustic emission amplifier 23 still does not touch the plate-shaped bracket 10-1.

Figure 17A:
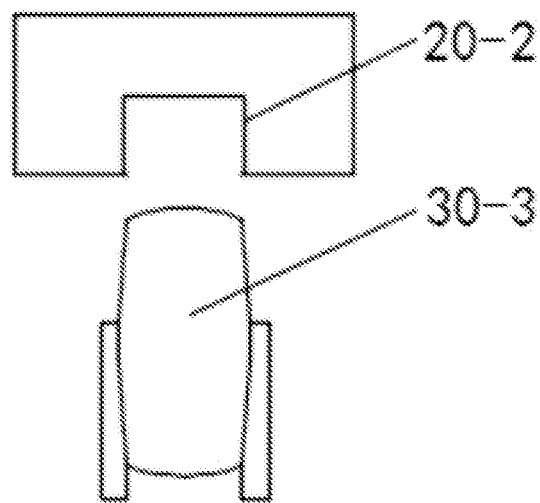
FIG. 17A illustrates a structural schematic diagram showing that a sliding chute is arranged on the guide column.
Figure 17B:
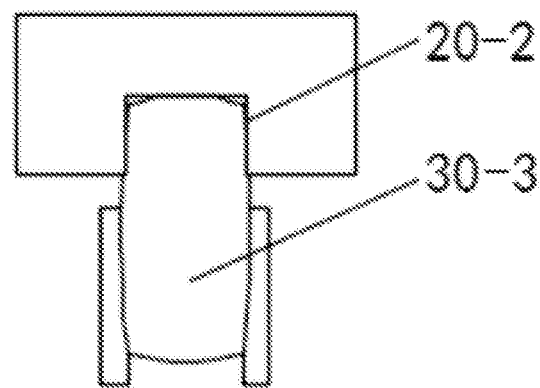
FIG. 17B illustrates a schematic diagram showing a connection relationship between the guide column provided with the sliding chute and the pulley.

As shown in FIG. 17A and FIG. 17B, the width of the pulley 30-3 matches the width of the sliding chute 20-2, and the pulley 30-3 is stuck in the sliding chute 20-2 due to a small elastic deformation formed in a transverse direction in the pulley. At this moment, the pulley 30-3 embedded into the sliding chute 20-2 can bear the weight of the acoustic emission amplifier placing rack 30 and the weight of the acoustic emission amplifier 23 without sliding freely.

As shown in FIG. 15, the guide column 20 is fixed by welding, and an open notch is provided at the top or two ends of the guide column 20. The acoustic emission amplifier placing rack 30 is placed in or taken out through the open notch. Meanwhile, the guide column 20 is provided with the guide rail 20-1 or the sliding chute 20-2, such that the acoustic emission amplifier placing rack 30 can slide up and down.

The junction between the upper part of the triaxial cavity 6 and the lower part of the triaxial cavity 6 is parallel to the upper top surface of the triaxial cavity coupling bracket 10. When the upper part of the triaxial cavity 6 is completely lowered, the lowest position of the guide rail 20-1 or the sliding chute 20-2 moving relative to the pulley 30-3 is always higher than the upper top surface of the triaxial cavity coupling bracket 10. In the high-temperature and high-confining pressure test process, the acoustic emission amplifier placing rack 30 can be separated from the triaxial cavity coupling bracket 10 and can be spaced apart from the triaxial cavity coupling bracket 10 by a certain distance, such that the outer wall temperature of the triaxial cavity 6 is not directly conducted to the acoustic emission amplifier 23 through the triaxial cavity coupling bracket 10.

Embodiment 2

The tempo-spatial evolution test system for rock breaking in deep and complex environment in this embodiment includes an acoustic emission sensor assembly and an acoustic emission amplifier assembly that are arranged on the rock mechanics test system 1. The rock mechanics test system 1 includes the triaxial cavity base 13, the triaxial cavity 6 mounted on the triaxial cavity base 13, and the triaxial cavity lifting oil cylinder 2 fixedly mounted on the top frame of the rock mechanics test system 1. The output end of the triaxial cavity lifting oil cylinder 2 is mounted with the lifting rod 3 and the lower lifting end 4 of the lifting rod 3 is fixed to the top of the triaxial cavity 6. The upright column 5, the test piece indenter 9 and the indenter base 11 are coaxially mounted from top to bottom in the inner cavity of the triaxial cavity 6. The upright column 5 is fixed to the top frame of the rock mechanics test system 1 by a bolt, the indenter base 11 is fixed to the triaxial cavity base 13, between the test piece indenter 9 and the indenter base 11 there is space for placing a test piece, and the triaxial cavity lifting oil cylinder 2 drives the triaxial cavity 6 through the lifting rod 3 to move up and down along the upright column 5.

The outer wall of the triaxial cavity 6 is provided with a set of acoustic emission sensor assemblies in positional correspondence with the test piece indenter 9 and a set of acoustic emission sensor assemblies in positional correspondence with the indenter base 11, and the triaxial cavity coupling bracket 10 is arranged between the two sets of acoustic emission sensor assemblies. The triaxial cavity coupling bracket 10 includes the plate-shaped bracket 10-1, two sickle-shaped brackets 10-2, and at least three bracket bolts 10-3-1, 10-3-2 and 10-3-3. The two symmetrically arranged sickle-shaped brackets 10-2 are directly connected at one end through the bracket bolt 10-3-1, another end thereof extends far away from the triaxial cavity 6 and are connected, in an approaching manner, to the same plate-shaped bracket 10-1 through the bracket bolts 10-3-2 and 10-3-3. The main body of the triaxial cavity coupling bracket 10 mainly composed of one plate-shaped bracket 10-1 and two sickle-shaped brackets 10-2 is annular and is tightly wrapped on the outer wall of the triaxial cavity 6. Two sets of guide columns 20 are mounted on the frame of the rock mechanics test system 1, and the acoustic emission amplifier assembly is mounted between the two guide columns 20 and is located above the plate-shaped bracket 10-1. The acoustic emission amplifier assembly is connected, through a signal line, to the acoustic emission sensor assembly mounted on the triaxial cavity 6.

When the rock mechanics test system 1 is in operation, the triaxial cavity 6 moves downward to fit with the triaxial cavity base 13, and at this moment, the acoustic emission amplifier assembly does not contact the plate-shaped bracket 10-1. When the rock mechanics test system 1 stops working and lifts the triaxial cavity 6, the triaxial cavity coupling bracket 10 is lifted together with the triaxial cavity 6 and the plate-shaped bracket 10-1 holds up the acoustic emission amplifier assembly such that the acoustic emission amplifier assembly is lifted.

As shown in FIG. 1, the inner cavity of the triaxial cavity 6 is provided with the semi-suspended thermal conductive copper wire 15 and the internal temperature sensor 16 for testing an internal temperature of the triaxial cavity 6, and the outer wall of the triaxial cavity 6 is fitted with the heating element 28 and the external temperature sensor 14 for testing an outer wall temperature of the triaxial cavity 6. The signal line access panel 12 connected to the external temperature sensor 14 and the internal temperature sensor 16 is arranged along the bottom of the indenter base 11 annularly and is in communication connection, through the signal line, to the acquisition and control module 26 of the display module 27 arranged outside the triaxial cavity 6.

Further, the triaxial cavity lifting oil cylinder 2 is operably connected to the acquisition and control module 26, and the acquisition and control module 26 outputs a control signal to the triaxial cavity lifting oil cylinder 2 for system control. Meanwhile, the manual lifting device 18 is further arranged on the oil pipeline 17 where the triaxial cavity lifting oil cylinder 2 is connected to an oil tank, and the manual lifting device 18 outputs a control signal to the triaxial cavity lifting oil cylinder 2 for manual control.

Embodiment 3

The tempo-spatial evolution test system for rock breaking in deep and complex environment in this embodiment includes an acoustic emission sensor assembly and an acoustic emission amplifier assembly that are arranged on the rock mechanics test system 1. The rock mechanics test system 1 includes the triaxial cavity base 13, the triaxial cavity 6 arranged on the triaxial cavity base 13, and the triaxial cavity lifting oil cylinder 2 fixedly mounted on the top frame of the rock mechanics test system 1. The output end of the triaxial cavity lifting oil cylinder 2 is mounted with the lifting rod 3 and the lower lifting end 4 of the lifting rod 3 is fixed to the top of the triaxial cavity 6. The upright column 5, the test piece indenter 9 and the indenter base 11 are coaxially arranged from top to bottom in the inner cavity of the triaxial cavity 6. The upright column 5 is fixed to the top frame of the rock mechanics test system 1 by a bolt, the indenter base 11 is fixed to the triaxial cavity base 13, between the test piece indenter 9 and the indenter base 11 there is space for placing a test piece, and the triaxial cavity lifting oil cylinder 2 drives the triaxial cavity 6 through the lifting rod 3 to move up and down along the upright column 5.

The outer wall of the triaxial cavity 6 is provided with a set of acoustic emission sensor assembly in positional correspondence with the test piece indenter 9 and a set of acoustic emission sensor assembly in positional correspondence with the indenter base 11, and the triaxial cavity coupling bracket 10 is installed between the two sets of acoustic emission sensor assembly. The triaxial cavity coupling bracket 10 includes the plate-shaped bracket 10-1, two sickle-shaped brackets 10-2, and at least three bracket bolts 10-3-1, 10-3-2 and 10-3-3. The two symmetrically arranged sickle-shaped brackets 10-2 are directly connected at one ends through the bracket bolt 10-3-1, another ends thereof extend far away from the triaxial cavity 6 and are connected, in an approaching manner, to the same plate-shaped bracket 10-1 through the bracket bolts 10-3-2 and 10-3-3. The main body of the triaxial cavity coupling bracket 10 mainly composed of one plate-shaped bracket 10-1 and two sickle-shaped brackets 10-2 is annular and is tightly hooped on the outer wall of the triaxial cavity 6. Two sets of guide columns 20 are mounted on the frame of the rock mechanics test system 1, and the acoustic emission amplifier assembly is arranged between the two guide columns 20 and is located above the plate-shaped bracket 10-1. The acoustic emission amplifier assembly is connected, through a signal line, to the acoustic emission sensor assembly mounted on the triaxial cavity 6.

When the rock mechanics test system 1 is in operation, the triaxial cavity 6 moves downward to fit with the triaxial cavity base 13, and at this moment, the acoustic emission amplifier assembly does not touch the plate-shaped bracket 10-1. When the rock mechanics test system 1 stops working and lifts the triaxial cavity 6, the triaxial cavity coupling bracket 10 is lifted together with the triaxial cavity 6 and the plate-shaped bracket 10-1 holds up the acoustic emission amplifier assembly such that the acoustic emission amplifier assembly is lifted.

The acoustic emission sensor assembly includes a plurality of acoustic emission detection heads and the clamp fixing spring 7. Each of the acoustic emission detection heads includes an acoustic emission sensor and the acoustic emission sensor clamp 8 arranged in one to one correspondence.

As shown in FIG. 4 to FIG. 14, the acoustic emission sensor clamp 8 includes the coupling screw 8-3, as well as the clamp cover 8-1, the clamp cylinder 8-2, and the coupling panel 8-4 which are threadedly connected in sequence. The clamp cover 8-1 includes the cover body 8-1-2 provided with internal threads, and the cover spring 8-1-1 installed at the center of the bottom surface of the inner cavity of the cover body 8-1-2. Two ends of the cylinder wall of the clamp cylinder 8-2 are provided with external threads, and an end of the cylinder wall is provided with the arc-shaped notch 8-2-1 allowing the signal line to pass through, and three cut-through coupling holes 8-2-2 are evenly distributed on the cylinder wall along a circumferential direction. Three coupling screws 8-3 pass through the three coupling holes 8-2-2 respectively to clamp the acoustic emission sensor in a radial direction of the clamp cylinder 8-2 at the center of the inner cavity of the clamp cylinder 8-2. The upper surface of the coupling panel 8-4 is flat and straight and is provided with a threaded through hole at the center of the upper surface, and the lower surface of the coupling panel 8-4 is bent along a uniaxial direction and forms a cambered surface fitting with the outer surface of the cylinder wall of the clamp cylinder 8-2.

The triaxial cavity 6 is further provided with two sets of acoustic emission detection heads in positional correspondence with two ends of the test piece, and each set of acoustic emission detection heads is composed of N acoustic emission detection heads uniformly distributed on the outer wall of the triaxial cavity 6 along a circumferential direction and the clamp fixing spring 7 connecting the N acoustic emission detection heads end to end to form a ring. Two ends of the acoustic emission sensor are respectively connected to the clamp fixing spring 7 extending into the acoustic emission detection heads from the arc-shaped notch 8-2-1, and the clamp fixing spring 7 in a stretched state provides the acoustic emission sensor with a pressure urging the acoustic emission detection head to stably fit with the outer wall of the triaxial cavity 6, wherein N is a positive integer greater than 2.

Typically, the value of N is 3 or 4. At this moment, a smaller number of acoustic emission detection heads can jointly form a test surface. However, a complete test surface cannot be effectively formed if the number of the acoustic emission detection heads in the same plane is less than three. If the number of the acoustic emission detection heads in the same plane is greater than 4, this not only wastes components and parts but also complicates structures such as jigs and fixtures. Furthermore, this makes little contribution to the acoustic emission test effect, instead, increasing the difficulty of analysis.

For example, if the value of N is 4, there are eight total acoustic emission detection heads in the two sets, and eight acoustic emission sensors of the eight acoustic emission detection heads are separately connected to eight corresponding acoustic emission amplifiers 23.

The acoustic emission amplifier assembly includes the acoustic emission amplifier 23, the guide column 20, and the acoustic emission amplifier placing rack 30. Two guide columns 20 vertically fixed to the triaxial cavity base 13 are slidably connected to two ends of the acoustic emission amplifier placing rack 30, respectively. The acoustic emission amplifiers 23 connected to the acoustic emission sensors in one-to-one correspondence are arranged on the acoustic emission amplifier placing rack 30 far away from the triaxial cavity 6, and the acoustic emission amplifier 23 sends an amplified signal to the acoustic emission sensor via the signal line passing through the arc-shaped notch 8-2-1.

In this embodiment, the acoustic emission sensor assembly includes an acoustic emission sensor and the acoustic emission sensor clamp 8 configured to mount the acoustic emission sensor, and the acoustic emission sensor and the acoustic emission sensor clamp 8 are mounted and connected in one-to-one correspondence. The acoustic emission sensor clamp 8 includes the coupling screw 8-3, as well as the clamp cover 8-1, the clamp cylinder 8-2, and the coupling panel 8-4 which are threaded together in sequence. The clamp cover 8-1, the clamp cylinder 8-2, and the coupling panel 8-4 are threaded together in sequence to form an overall body, such that an overall and effective clamp device is formed. In another aspect, four acoustic emission sensors are connected by the clamp fixing spring 7 passing through the acoustic emission sensor clamp 8, and the four acoustic emission sensors are connected in series to form a set of ring-shaped acoustic emission detection heads constantly biased toward the center by the spring in a stretched state. The acoustic emission sensor is forced to stably press against the outer wall of the triaxial cavity 6 using a centripetal component force formed on the acoustic emission sensor by the elastic force of the clamp fixing spring 7, to ensure a good and stable contact between the acoustic emission sensor and the triaxial cavity 6. Furthermore, the elastic force of the clamp fixing spring 7 may be restorable, the device is not to be damaged and is convenient to be assembled or disassembled when the acoustic emission sensor assembly needs to be moved or removed for repair.

Four acoustic emission sensors are arranged at corresponding positions on the upper end of the test piece, and four acoustic emission sensors are arranged at corresponding positions on the lower end of the test piece. However, eight acoustic emission amplifiers 23 are connected correspondingly to the eight acoustic emission sensors through electrical signal lines are all arranged on the acoustic emission amplifier placing rack 30. The acoustic emission amplifier assembly is lifted along with the acoustic emission sensor assembly by the triaxial cavity coupling bracket 10 which is tightly wrapped on the triaxial cavity 6.

In order to better explain the connection between the clamp fixing spring 7 and the acoustic emission sensor, two ends of the acoustic emission sensor are respectively provided with a small hole allowing the connector of the clamp fixing spring 7 to pass through. Two adjacent acoustic emission sensors are directly connected through one clamp fixing spring 7, or two adjacent acoustic emission sensors are connected through a plurality of clamp fixing springs 7 connected in series.

In order to ensure the acoustic emission sensor to more stably fit with a test point, the cover spring 8-1-1 applies a positive pressure from the back of the acoustic emission sensor such that the acoustic emission sensor can be closely fitted with the outer wall of the triaxial cavity 6. The cover spring 8-1-1 may use a spring with different pitches at the upper and lower parts of the spring, or may use an equal-pitch spring, or may use an unequal-diameter spring or an equal-diameter spring.

Figure 14:
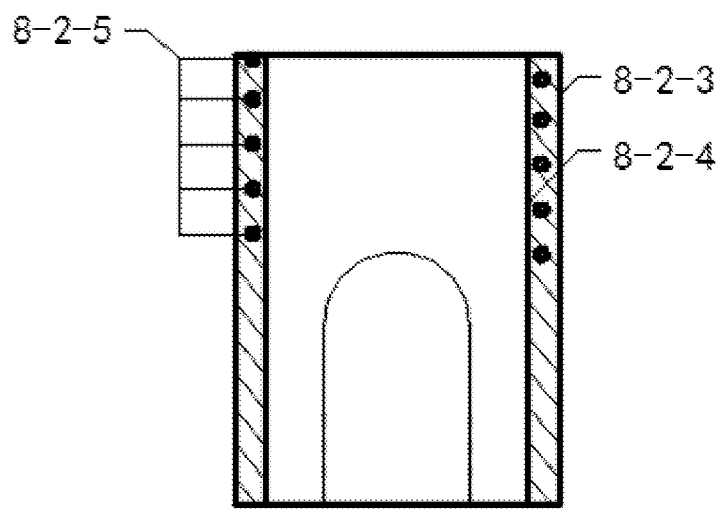
FIG. 14 is a cross-sectional view of the clamp cylinder.

As shown in FIG. 14, to facilitate the arrangement of the signal line, in this embodiment, the cylinder wall of the clamp cylinder 8-2 is provided with the arc-shaped notch 8-2-1, and the coupling panel 8-4 is provided with a circular hole. Specifically, one end of the cylinder wall of the clamp cylinder 8-2 is provided with the arc-shaped notch 8-2-1 whose frontal projection plane is shaped like an inverted "U". The groove 8-4-1 is respectively arranged at edges near the left and right sides on the upper surface of the coupling panel 8-4, and two small-diameter circular holes are provided outside the groove 8-4-1.

As shown in FIG. 14, to reduce the adverse effect of high temperature on the acoustic emission sensor, the clamp cylinder 8-2 includes the outer metal cylinder 8-2-3, the inner metal cylinder 8-2-4, and the cooling water circulation pipeline 8-2-5. Between the outer metal cylinder 8-2-3 and the inner metal cylinder 8-2-4 coaxially sleeved there is formed a condensation cavity communicating with the cooling water circulation pipeline 8-2-5 and allowing condensate to be introduced. The outer metal cylinder 8-2-3 is made of copper, and the inner metal cylinder 8-2-4 is also made of copper.

The present invention is focused on providing a dedicated fixing device respectively for the acoustic emission sensor and the acoustic emission amplifier 23, which not only can ensure that the acoustic emission sensor can linearly and stably touch the triaxial cavity 6 in the test process, but also can ensure that no equipment is damaged when it is needed to adjust the installation position of the acoustic emission sensor or disassemble the acoustic emission sensor, and can also ensure that the acoustic emission amplifier 23 is spaced apart from the triaxial cavity 6 without signal interference when the acoustic emission amplifier 23 and the acoustic emission sensor are connected accordingly. That is, according to the present invention, by using the acoustic emission sensor assembly which can flexibly and stably fit the acoustic emission sensor with a designated position on the outer wall of the triaxial cavity 6 and the acoustic emission amplifier assembly configured to mount the acoustic emission amplifier 23 away from the triaxial cavity 6, in the process of lifting the triaxial cavity 6, the cable for signal connection of the acoustic emission sensor and the acoustic emission amplifier 23 as well as the cable for signal connection of the acoustic emission amplifier 23 and the acquisition and control module 26 of the rock mechanics test system 1 are never disturbed at two ends. In this way, the effect of accurate acoustic emission signal and strong anti-interference performance is achieved for the rock mechanics test system 1 under high temperature and high pressure.

Embodiment 4

The tempo-spatial evolution test system for rock breaking in deep and complex environment in this embodiment includes an acoustic emission sensor assembly and an acoustic emission amplifier assembly that are arranged on the rock mechanics test system 1. The rock mechanics test system 1 includes the triaxial cavity base 13, the triaxial cavity 6 mounted on the triaxial cavity base 13, and the triaxial cavity lifting oil cylinder 2 fixedly installed on the top frame of the rock mechanics test system 1. The output end of the triaxial cavity lifting oil cylinder 2 is mounted with the lifting rod 3 and the lower lifting end 4 of the lifting rod 3 is fixed to the top of the triaxial cavity 6. The upright column 5, the test piece indenter 9 and the indenter base 11 are coaxially mounted from top to bottom in the inner cavity of the triaxial cavity 6. The upright column 5 is fixed to the top frame of the rock mechanics test system 1 by a bolt, the indenter base 11 is fixed to the triaxial cavity base 13, between the test piece indenter 9 and the indenter base 11 there is space for placing a test piece, and the triaxial cavity lifting oil cylinder 2 drives the triaxial cavity 6 through the lifting rod 3 to move up and down along the upright column 5.

The outer wall of the triaxial cavity 6 is provided with a set of acoustic emission sensor assembly in positional correspondence with the test piece indenter 9 and a set of acoustic emission sensor assembly in positional correspondence with the indenter base 11, and the triaxial cavity coupling bracket 10 is mounted between the two sets of acoustic emission sensor assembly. The triaxial cavity coupling bracket 10 includes the plate-shaped bracket 10-1, two sickle-shaped brackets 10-2, and at least three bracket bolts 10-3-1, 10-3-2 and 10-3-3. The two symmetrically arranged sickle-shaped brackets 10-2 are directly connected at one end through the bracket bolt 10-3-1, another end thereof extends far away from the triaxial cavity 6 and is connected, in an approaching manner, to the same plate-shaped bracket 10-1 through the bracket bolts 10-3-2 and 10-3-3. The main body of the triaxial cavity coupling bracket 10 mainly composed of one plate-shaped bracket 10-1 and two sickle-shaped brackets 10-2 is annular and is tightly hooped on the outer wall of the triaxial cavity 6. Two sets of guide columns 20 are mounted on the frame of the rock mechanics test system 1, and the acoustic emission amplifier assembly is arranged between the two guide columns 20 and is located above the plate-shaped bracket 10-1. The acoustic emission amplifier assembly is connected, through a signal line, to the acoustic emission sensor assembly mounted on the triaxial cavity 6.

When the rock mechanics test system 1 is in operation, the triaxial cavity 6 moves downward to fit with the triaxial cavity base 13, and at this moment, the acoustic emission amplifier assembly does not touch the plate-shaped bracket 10-1. When the rock mechanics test system 1 stops working and lifts the triaxial cavity 6, the triaxial cavity coupling bracket 10 is lifted together with the triaxial cavity 6 and the plate-shaped bracket 10-1 supports the acoustic emission amplifier assembly such that the acoustic emission amplifier assembly is lifted.

Further, the acoustic emission amplifier assembly includes the acoustic emission amplifier 23 and the acoustic emission amplifier placing rack 30 where the acoustic emission amplifier 23 is mounted. The acoustic emission amplifier placing rack 30 includes the structural plate 30-1 internally divided into a plurality of compartments and having a frame structure, and the PVC heat insulation layer 30-2 attached to each compartment. The compartment is opened at the top and bottom, and the acoustic emission amplifier 23 is exactly embedded into the compartment and two ends of the acoustic emission amplifier 23 are connected to the signal line protruding from the compartment.

Further, two ends of the structural plate 30-1 are respectively provided with the pulley 30-3, and the two guide columns 20 are respectively provided with the guide rail 20-1 or the sliding chute 20-2 allowing the pulley 30-3 to slide up and down linearly, and the tail end at the bottom of the guide rail 20-1 or the sliding chute 20-2 is higher than the upper top surface of the plate-shaped bracket 10-1, such that even though the structural plate 30-1 moves to the lowest position, the acoustic emission amplifier 23 still does not touch the plate-shaped bracket 10-1.

Further, the width of the pulley 30-3 matches the width of the sliding chute 20-2, and the pulley 30-3 is stuck in the sliding chute 20-2 due to a small elastic deformation formed in a transverse direction in the pulley. At this moment, the pulley 30-3 embedded into the sliding chute 20-2 can bear the weight of the acoustic emission amplifier placing rack 30 and the weight of the acoustic emission amplifier 23 without sliding freely.

Alternatively, the pulleys 30-3 are coaxially connected in pairs, and the two coaxially connected pulleys 30-3 are spaced apart from each other to form space that can be stuck on two sides of the guide rail 20-1. After the two pulleys 30-3 on two sides of the guide rail 20-1 undergo a small elastic deformation in the transverse direction, the two pulleys 30-3 are stuck on the two sides of the guide rail 20-1 to clamp the guide rail 20-1. At this moment, the two pulleys 30-3 clamping the guide rail 20-1 can bear the weight of the acoustic emission amplifier placing rack 30 and the weight of the acoustic emission amplifier 23 without sliding freely.

Further, the inner cavity of the triaxial cavity 6 is provided with the semi-suspended thermal conductive copper wire 15 and the internal temperature sensor 16 for testing an internal temperature of the triaxial cavity 6. The outer wall of the triaxial cavity 6 is fitted with the heating element 28 and the external temperature sensor 14 for testing an outer wall temperature of the triaxial cavity 6. The signal line access panel 12 connected to the external temperature sensor 14 and the internal temperature sensor 16 is arranged along the bottom of the indenter base 11 annularly and is operably connected, through the signal line, to the acquisition and control module 26 of the display module 27 arranged outside the triaxial cavity 6.

Further, the triaxial cavity lifting oil cylinder 2 is operably connected with the acquisition and control module 26, and the acquisition and control module 26 outputs a control signal to the triaxial cavity lifting oil cylinder 2 for system control. The manual lifting device 18 is further arranged on the oil pipeline 17 where the triaxial cavity lifting oil cylinder 2 is connected to an oil tank, and the manual lifting device 18 outputs a control signal to the triaxial cavity lifting oil cylinder 2 for manual control.

Further, the acoustic emission sensor assembly includes a plurality of acoustic emission detection heads and the clamp fixing spring 7. Each acoustic emission detection head includes a respective acoustic emission sensor and the correspondingly arranged acoustic emission sensor clamp 8.

The acoustic emission sensor clamp 8 includes the coupling screw 8-3, as well as the clamp cover 8-1, the clamp cylinder 8-2 and the coupling panel 8-4 which are threadedly connected in sequence. The clamp cover 8-1 includes the cover body 8-1-2 provided with an internal thread, and the cover spring 8-1-1 installed at the center of the bottom surface of the inner cavity of the cover body 8-1-2. Two ends of the cylinder wall of the clamp cylinder 8-2 are provided with an external thread, and an end of the cylinder wall is provided with the arc-shaped notch 8-2-1 allowing the signal line to pass through. Three cut-through coupling holes 8-2-2 are evenly distributed on the cylinder wall along a circumferential direction, and three coupling screws 8-3 pass through the three coupling holes 8-2-2 respectively to clamp the acoustic emission sensor in a radial direction of the clamp cylinder 8-2 at the center of the inner cavity of the clamp cylinder 8-2. The upper surface of the coupling panel 8-4 is flat and straight and is provided with a threaded through hole at the center of the upper surface, and the lower surface of the coupling panel 8-4 is bent along a uniaxial direction and forms a cambered surface fitting with the outer surface of the cylinder wall of the clamp cylinder 8-2.

The triaxial cavity 6 is further provided with two sets of acoustic emission detection heads in positional correspondence with two ends of the test piece, wherein one set of acoustic emission detection heads is composed of four acoustic emission detection heads uniformly distributed on the outer wall of the triaxial cavity 6 along a circumferential direction and the clamp fixing spring 7 connecting the four acoustic emission detection heads end to end to form a ring. Two ends of the acoustic emission sensor are respectively connected to the clamp fixing spring 7 extending into the acoustic emission detection heads from the arc-shaped notch 8-2-1, and the clamp fixing spring 7 in a stretched state provides the acoustic emission sensor with a pressure forcing the acoustic emission detection head to stably fit with the outer wall of the triaxial cavity 6.

The acoustic emission amplifier placing rack 30 includes the structural plate 30-1 provided with eight two-head open grids with the PVC heat insulation layer 30-2 inside. The eight two-head open grids are arranged in two rows and four columns, and eight acoustic emission amplifiers 23 may be placed in the eight two-head open grids. Two ends of the acoustic emission amplifier 23 opposite to each other are opened, signal lines may be connected, and the signal lines may be kept straight, neither bent nor twisted.

In the high-temperature test process, the PVC heat insulation layer 30-2 can effectively prevent thermal energy conducted from the high-temperature cavity wall to the outer metal cylinder wall from further flowing to the acoustic emission amplifier 23, such that an adverse effect on the acoustic emission signal may be eliminated. Using the acoustic emission amplifier placing rack 30 has the following advantages. First, the acoustic emission amplifier 23 can be separated from the cavity wall of the triaxial cavity 6 to achieve heat insulation, and an adverse effect of the high temperature on the acoustic emission device may be reduced in the high-temperature test process. Second, the acoustic emission signal line of the acoustic emission device can be smoothly transitioned instead of being bent freely, thereby ensuring smooth input and output of the signal without leading to problems such as interference signals and weak signals caused by bending of the signal line. Third, using the acoustic emission amplifier placing rack 30 may overcome defects of easy slipping and poor aesthetic appearance caused by a fact that most of acoustic emission amplifiers 23 in the current laboratories are randomly hung on side walls of cavities or stacked on a certain bracket.

Preferably, two ends of the cover spring 8-1-1 have different diameters, and the cover spring 8-1-1 is frustum-shaped as a whole. The larger end of the frustum-shaped cover spring 8-1-1 is mounted on the inner bottom of the cover body 8-1-2, and the smaller end of the frustum-shaped cover spring 8-1-1 is employed to abut against the acoustic emission sensor and apply, to the acoustic emission sensor, an external thrust force that enables the acoustic emission sensor to better fit with the outer wall of the triaxial cavity 6. Moreover, when the frustum-shaped cover spring 8-1-1 is in a naturally extended state, the smaller end may extend beyond the cover body 8-1-2. The cover spring 8-1-1 cannot be effectively fixed into the cover body 8-1-2 if the cover spring 8-1-1 is too small in diameter. However, the cover spring 8-1-1 may cause blockage and fail to work if the cover spring 8-1-1 is too large in diameter.

Furthermore, the three coupling screws 8-3 are linearly distributed on the cylinder wall of the clamp cylinder 8-2 to form a coupling system. In order to enable the acoustic emission sensor clamp 8 to fix the acoustic emission sensors of different sizes, the elastic force of the coupling spring is adjusted by adjusting the number of screws screwed into a nut of the coupling screw 8-3, such that the coupling panel can firmly fit smaller-sized acoustic emission sensors.

Through the three coupling screws 8-3, the acoustic emission sensors of different sizes can be fixed in the center of the acoustic emission sensor clamp 8 and cannot waggle freely. Specifically, bolts of the coupling screws 8-3 are inserted into a coupling spring slightly larger than the bolts and the coupling hole 8-2-2 in diameter. The coupling screw 8-3 protrudes from the cylinder wall of the clamp cylinder 8-2 through the coupling hole 8-2-2, and then the nut is fixed. When the nut is more deeply screwed in, the coupling spring is compressed, and the bolt as a whole is retracted. At this moment, there is more space in the cylinder wall of the clamp cylinder 8-2, such that a larger-sized acoustic emission sensor can be coupled. When the nut is screwed out, the bolt as a whole is squeezed in, and at this moment, a smaller-sized acoustic emission sensor can be coupled. Based on the fact that a triangle is stable and three points are the minimum values for determining a plane, three coupling screws 8-3 are used for fixation. Disadvantages of using four or even more coupling screws 8-3 are as below: 1) failure in substantially improving the degree of stability of the acoustic emission sensor required to be fixed; 2) waste of materials and labor costs, i.e., not economical enough; 3) more coupling holes 8-2-2 required to be processed on the cylinder wall of the clamp cylinder 8-2, reducing the strength and integrity of the acoustic emission sensor clamp 8.

Further, the clamp cylinder 8-2 includes the outer metal cylinder 8-2-3, the inner metal cylinder 8-2-4, and the cooling water circulation pipeline 8-2-5. Between the outer metal cylinder 8-2-3 and the inner metal cylinder 8-2-4 coaxially sleeved there is formed a condensation cavity communicating with the cooling water circulation pipeline 8-2-5 and allowing condensate to be introduced.

Further, the outer metal cylinder 8-2-3 is made of copper, and the inner metal cylinder 8-2-4 is also made of copper.

The above embodiments are merely preferred embodiments of the present invention, and are not intended to limit the present invention in any form. Any simple alterations or equivalent modifications shall fall within the scope of protection of the present invention.

What is claimed is:

1. A tempo-spatial evolution test system for rock breaking in a deep and complex environment, comprising acoustic emission sensor assemblies and acoustic emission amplifier assemblies, wherein the acoustic emission sensor assemblies and the acoustic emission amplifier assemblies are arranged on a rock mechanics test system;

the rock mechanics test system comprises a triaxial cavity base, a triaxial cavity mounted on the triaxial cavity base, and a triaxial cavity lifting oil cylinder fixedly mounted on a top frame of the rock mechanics test system, an output end of the triaxial cavity lifting oil cylinder is mounted with a lifting rod and a lower lifting end of the lifting rod is fixed to a top of the triaxial cavity, an upright column, a test piece indenter and an indenter base are coaxially mounted from top to bottom in an inner cavity of the triaxial cavity, the upright column is fixed to the top frame of the rock mechanics test system by a bolt, the indenter base is fixed to the triaxial cavity base, between the test piece indenter and the indenter base there is a first space for placing a test piece, and the triaxial cavity lifting oil cylinder drives the triaxial cavity through the lifting rod to move up and down along the upright column;

an outer wall of the triaxial cavity is provided with a first set of the acoustic emission sensor assemblies in positional correspondence with the test piece indenter and a second set of the acoustic emission sensor assemblies in positional correspondence with the indenter base, and a triaxial cavity coupling bracket is mounted between the first set of the acoustic emission sensor assemblies and the second set of the acoustic emission sensor assemblies;

the triaxial cavity coupling bracket comprises a plate-shaped bracket, a first sickle-shaped bracket, a second sickle-shaped bracket, a first bracket bolt, a second bracket bolt, and a third bracket bolt; the first sickle-shaped bracket and the second sickle-shaped bracket are symmetrically arranged; a first end of the first sickle-shaped bracket is directly connected to a first end of the second sickle-shaped bracket through the first bracket bolt, a second end of the first sickle-shaped bracket and a second end of the second sickle-shaped bracket extend far away from the triaxial cavity and are connected, in an approaching manner, to the plate-shaped bracket through the second bracket bolt and the third bracket bolt, and a main body of the triaxial cavity coupling bracket is annular and is tightly wrapped on the outer wall of the triaxial cavity; two sets of guide columns are mounted on a frame of the rock mechanics test system, and each acoustic emission amplifier assembly of the acoustic emission amplifier assemblies is mounted between the two sets of guide columns and is located above the plate-shaped bracket; and the each acoustic emission amplifier assembly is connected, through a first signal line, to each acoustic emission sensor assembly of the acoustic emission sensor assemblies mounted on the triaxial cavity; and when the rock mechanics test system is in operation, the triaxial cavity moves downward to fit with the triaxial cavity base, at this moment, the each acoustic emission amplifier assembly does not contact the plate-shaped bracket; when the rock mechanics test system stops working and lifts the triaxial cavity, the triaxial cavity coupling bracket is lifted together with the triaxial cavity and the plate-shaped bracket supports the each acoustic emission amplifier assembly such that the each acoustic emission amplifier assembly is lifted.

2. The tempo-spatial evolution test system for rock breaking in the deep and complex environment according to claim 1, wherein the each acoustic emission amplifier assembly comprises an acoustic emission amplifier and an acoustic emission amplifier placing rack, and the acoustic emission amplifier is mounted on the acoustic emission amplifier placing rack; the acoustic emission amplifier placing rack comprises a structural plate, the structural plate is internally divided into a plurality of compartments and having a frame structure, and a PVC heat insulation layer is attached to each compartment of the plurality of compartments; the each compartment is opened at the top and bottom, and the acoustic emission amplifier is exactly embedded into the each compartment and two ends of the acoustic emission amplifier are connected to a second signal line protruding from the each compartment.

3. The tempo-spatial evolution test system for rock breaking in the deep and complex environment according to claim 2, wherein two ends of the structural plate are respectively provided with a pulley, and the two sets of guide columns are respectively provided with a guide rail or a sliding chute, the guide rail or the sliding chute allows the pulley to slide up and down linearly, and a tail end at a bottom of the guide rail or the sliding chute is higher than an upper top surface of the plate-shaped bracket, such that even though the structural plate moves to a lowest position, the acoustic emission amplifier still does not contact the plate-shaped bracket.

4. The tempo-spatial evolution test system for rock breaking in the deep and complex environment according to claim 3, wherein a width of the pulley matches a width of the sliding chute, the pulley is stuck in the sliding chute due to a small elastic deformation formed in a transverse direction in the pulley, and at this moment, the pulley embedded into the sliding chute bears a weight of the acoustic emission amplifier placing rack and a weight of the acoustic emission amplifier without sliding freely;

alternatively, the pulleys are coaxially connected in pairs, and the two coaxially connected pulleys are spaced apart from each other to form a second space, the pulleys are stuck on two sides of the guide rail by the second space, after the two pulleys on the two sides of the guide rail undergo the small elastic deformation in the transverse direction, the two pulleys are stuck on the two sides of the guide rail to clamp the guide rail, at this moment, the two pulleys clamping the guide rail bears the weight of the acoustic emission amplifier placing rack and the weight of the acoustic emission amplifier without sliding freely.

5. The tempo-spatial evolution test system for rock breaking in the deep and complex environment according to claim 3, wherein the each acoustic emission sensor assembly comprises a plurality of acoustic emission detection heads and a clamp fixing spring; and each of the plurality of acoustic emission detection heads comprises an acoustic emission sensor and an acoustic emission sensor clamp arranged in one to one correspondence;

the acoustic emission sensor clamp comprises a coupling screw, a clamp cover, a clamp cylinder, and a coupling panel, and the clamp cover, the clamp cylinder, and the coupling panel are threadedly connected in sequence; the clamp cover comprises a cover body provided with an internal thread, and a cover spring installed at a center of a bottom surface of an inner cavity of the cover body; two ends of a cylinder wall of the clamp cylinder are provided with an external thread, and an end of the two ends of the cylinder wall is provided with an arc-shaped notch allowing the first signal line to pass through, and three cut-through coupling holes are evenly distributed on the cylinder wall along a circumferential direction, and three coupling screws pass through the three coupling holes respectively to clamp the acoustic emission sensor in a radial direction of the clamp cylinder at a center of an inner cavity of the clamp cylinder; an upper surface of the coupling panel is flat and straight and is provided with a threaded through hole at a center of the upper surface, and a lower surface of the coupling panel is bent along a uniaxial direction and forms a cambered surface fitting with an outer surface of the cylinder wall of the clamp cylinder; and the triaxial cavity is further provided with two sets of the plurality of acoustic emission detection heads in positional correspondence with two ends of the test piece, each of the two sets of the plurality of acoustic emission detection heads is composed of N acoustic emission detection heads uniformly distributed on the outer wall of the triaxial cavity along a circumferential direction and the clamp fixing spring connecting the N acoustic emission detection heads end to end to form a ring; two ends of the acoustic emission sensor are respectively connected to the clamp fixing spring extending into the acoustic emission detection heads from the arc-shaped notch, and the clamp fixing spring in a stretched state provides the acoustic emission sensor with a pressure urging the acoustic emission detection heads to stably fit with the outer wall of the triaxial cavity, wherein N is a positive integer greater than 2.

6. The tempo-spatial evolution test system for rock breaking in the deep and complex environment according to claim 5, wherein the clamp cylinder comprises an outer metal cylinder, an inner metal cylinder, and a cooling water circulation pipeline, between the outer metal cylinder and the inner metal cylinder coaxially sleeved there is formed a condensation cavity communicating with the cooling water circulation pipeline and allowing a condensate to be introduced.

7. The tempo-spatial evolution test system for rock breaking in the deep and complex environment according to claim 2, wherein the acoustic emission amplifier placing rack comprises the structural plate, the structural plate is provided with a plurality of grooves, and the PVC heat insulation layer is attached to each groove of the plurality of grooves, a size of the each groove couples to a size of the acoustic emission amplifier, and the plurality of grooves arranged in a row in parallel are provided with a plurality of buckles fixed to the structural plate at two ends arranged perpendicular to an arrangement direction, and each of the plurality of buckles is configured to fixedly connect the second signal line of the acoustic emission amplifier.

8. The tempo-spatial evolution test system for rock breaking in the deep and complex environment according to claim 7, wherein a width of a pulley matches a width of a sliding chute, the pulley is stuck in the sliding chute due to a small elastic deformation formed in a transverse direction in the pulley, and at this moment, the pulley embedded into the sliding chute bears a weight of the acoustic emission amplifier placing rack and a weight of the acoustic emission amplifier without sliding freely;

alternatively, pulleys are coaxially connected in pairs, and the two coaxially connected pulleys are spaced apart from each other to form a second space, the pulleys are stuck on two sides of the guide rail by the second space, after the two pulleys on the two sides of the guide rail undergo the small elastic deformation in the transverse direction, the two pulleys are stuck on the two sides of the guide rail to clamp the guide rail, at this moment, the two pulleys clamping the guide rail bears the weight of the acoustic emission amplifier placing rack and the weight of the acoustic emission amplifier without sliding freely.

9. The tempo-spatial evolution test system for rock breaking in the deep and complex environment according to claim 7, wherein the each acoustic emission sensor assembly comprises a plurality of acoustic emission detection heads and a clamp fixing spring; and each of the plurality of acoustic emission detection heads comprises an acoustic emission sensor and an acoustic emission sensor clamp arranged in one to one correspondence;

the acoustic emission sensor clamp comprises a coupling screw, a clamp cover, a clamp cylinder, and a coupling panel, and the clamp cover, the clamp cylinder, and the coupling panel are threadedly connected in sequence; the clamp cover comprises a cover body provided with an internal thread, and a cover spring installed at a center of a bottom surface of an inner cavity of the cover body; two ends of a cylinder wall of the clamp cylinder are provided with an external thread, and an end of the two ends of the cylinder wall is provided with an arc-shaped notch allowing the first signal line to pass through, and three cut-through coupling holes are evenly distributed on the cylinder wall along a circumferential direction, and three coupling screws pass through the three coupling holes respectively to clamp the acoustic emission sensor in a radial direction of the clamp cylinder at a center of an inner cavity of the clamp cylinder; an upper surface of the coupling panel is flat and straight and is provided with a threaded through hole at a center of the upper surface, and a lower surface of the coupling panel is bent along a uniaxial direction and forms a cambered surface fitting with an outer surface of the cylinder wall of the clamp cylinder; and the triaxial cavity is further provided with two sets of the plurality of acoustic emission detection heads in positional correspondence with two ends of the test piece, each of the two sets of the plurality of acoustic emission detection heads is composed of N acoustic emission detection heads uniformly distributed on the outer wall of the triaxial cavity along a circumferential direction and the clamp fixing spring connecting the N acoustic emission detection heads end to end to form a ring; two ends of the acoustic emission sensor are respectively connected to the clamp fixing spring extending into the acoustic emission detection heads from the arc-shaped notch, and the clamp fixing spring in a stretched state provides the acoustic emission sensor with a pressure urging the acoustic emission detection heads to stably fit with the outer wall of the triaxial cavity, wherein N is a positive integer greater than 2.

10. The tempo-spatial evolution test system for rock breaking in the deep and complex environment according to claim 9, wherein
the clamp cylinder comprises an outer metal cylinder, an inner metal cylinder, and a cooling water circulation pipeline, between the outer metal cylinder and the inner metal cylinder coaxially sleeved there is formed a condensation cavity communicating with the cooling water circulation pipeline and allowing a condensate to be introduced.

11. The tempo-spatial evolution test system for rock breaking in the deep and complex environment according to claim 2, wherein the each acoustic emission sensor assembly comprises a plurality of acoustic emission detection heads and a clamp fixing spring; and each of the plurality of acoustic emission detection heads comprises an acoustic emission sensor and an acoustic emission sensor clamp arranged in one to one correspondence;

the acoustic emission sensor clamp comprises a coupling screw, a clamp cover, a clamp cylinder, and a coupling panel, and the clamp cover, the clamp cylinder, and the coupling panel are threadedly connected in sequence; the clamp cover comprises a cover body provided with an internal thread, and a cover spring installed at a center of a bottom surface of an inner cavity of the cover body; two ends of a cylinder wall of the clamp cylinder are provided with an external thread, and an end of the two ends of the cylinder wall is provided with an arc-shaped notch allowing the first signal line to pass through, and three cut-through coupling holes are evenly distributed on the cylinder wall along a circumferential direction, and three coupling screws pass through the three coupling holes respectively to clamp the acoustic emission sensor in a radial direction of the clamp cylinder at a center of an inner cavity of the clamp cylinder; an upper surface of the coupling panel is flat and straight and is provided with a threaded through hole at a center of the upper surface, and a lower surface of the coupling panel is bent along a uniaxial direction and forms a cambered surface fitting with an outer surface of the cylinder wall of the clamp cylinder; and the triaxial cavity is further provided with two sets of the plurality of acoustic emission detection heads in positional correspondence with two ends of the test piece, each of the two sets of the plurality of acoustic emission detection heads is composed of N acoustic emission detection heads uniformly distributed on the outer wall of the triaxial cavity along a circumferential direction and the clamp fixing spring connecting the N acoustic emission detection heads end to end to form a ring; two ends of the acoustic emission sensor are respectively connected to the clamp fixing spring extending into the acoustic emission detection heads from the arc-shaped notch, and the clamp fixing spring in a stretched state provides the acoustic emission sensor with a pressure urging the acoustic emission detection heads to stably fit with the outer wall of the triaxial cavity, wherein N is a positive integer greater than 2.

12. The tempo-spatial evolution test system for rock breaking in the deep and complex environment according to claim 11, wherein
the clamp cylinder comprises an outer metal cylinder, an inner metal cylinder, and a cooling water circulation pipeline, between the outer metal cylinder and the inner metal cylinder coaxially sleeved there is formed a condensation cavity communicating with the cooling water circulation pipeline and allowing a condensate to be introduced.

13. The tempo-spatial evolution test system for rock breaking in the deep and complex environment according to claim 1, wherein the inner cavity of the triaxial cavity is provided with a semi-suspended thermal conductive copper wire and an internal temperature sensor for testing an internal temperature of the triaxial cavity, the outer wall of the triaxial cavity is fitted with a heating element and an external temperature sensor for testing an outer wall temperature of the triaxial cavity, a signal line access panel connected to the external temperature sensor and the internal temperature sensor is arranged along a bottom of the indenter base annularly and is operably connected, through a third signal line, to an acquisition and control module of a display module arranged outside the triaxial cavity.

14. The tempo-spatial evolution test system for rock breaking in the deep and complex environment according to claim 13, wherein the triaxial cavity lifting oil cylinder is operably connected with the acquisition and control module, and the acquisition and control module outputs a first control signal to the triaxial cavity lifting oil cylinder for a system control; a manual lifting device is further arranged on an oil pipeline, the triaxial cavity lifting oil cylinder is connected to an oil tank by the oil pipeline, and the manual lifting device outputs a second control signal to the triaxial cavity lifting oil cylinder for a manual control.

15. The tempo-spatial evolution test system for rock breaking in the deep and complex environment according to claim 1, wherein the each acoustic emission sensor assembly comprises a plurality of acoustic emission detection heads and a clamp fixing spring; and each of the plurality of acoustic emission detection heads comprises an acoustic emission sensor and an acoustic emission sensor clamp arranged in one to one correspondence;

the acoustic emission sensor clamp comprises a coupling screw, a clamp cover, a clamp cylinder, and a coupling panel, and the clamp cover, the clamp cylinder, and the coupling panel are threadedly connected in sequence; the clamp cover comprises a cover body provided with an internal thread, and a cover spring installed at a center of a bottom surface of an inner cavity of the cover body; two ends of a cylinder wall of the clamp cylinder are provided with an external thread, and an end of the two ends of the cylinder wall is provided with an arc-shaped notch allowing the first signal line to pass through, and three cut-through coupling holes are evenly distributed on the cylinder wall along a circumferential direction, and three coupling screws pass through the three coupling holes respectively to clamp the acoustic emission sensor in a radial direction of the clamp cylinder at a center of an inner cavity of the clamp cylinder; an upper surface of the coupling panel is flat and straight and is provided with a threaded through hole at a center of the upper surface, and a lower surface of the coupling panel is bent along a uniaxial direction and forms a cambered surface fitting with an outer surface of the cylinder wall of the clamp cylinder; and the triaxial cavity is further provided with two sets of the plurality of acoustic emission detection heads in positional correspondence with two ends of the test piece, each of the two sets of the plurality of acoustic emission detection heads is composed of N acoustic emission detection heads uniformly distributed on the outer wall of the triaxial cavity along a circumferential direction and the clamp fixing spring connecting the N acoustic emission detection heads end to end to form a ring; two ends of the acoustic emission sensor are respectively connected to the clamp fixing spring extending into the acoustic emission detection heads from the arc-shaped notch, and the clamp fixing spring in a stretched state provides the acoustic emission sensor with a pressure urging the acoustic emission detection heads to stably fit with the outer wall of the triaxial cavity, wherein N is a positive integer greater than 2.

16. The tempo-spatial evolution test system for rock breaking in the deep and complex environment according to claim 15, wherein the clamp cylinder comprises an outer metal cylinder, an inner metal cylinder, and a cooling water circulation pipeline, between the outer metal cylinder and the inner metal cylinder coaxially sleeved there is formed a condensation cavity communicating with the cooling water circulation pipeline and allowing a condensate to be introduced.

* * * * *